US012431274B2

(12) United States Patent
Kwon et al.

(10) Patent No.: US 12,431,274 B2
(45) Date of Patent: Sep. 30, 2025

(54) BASE AND TRANSFORMER DEVICE INCLUDING THE SAME

(71) Applicant: SOLUM CO., LTD., Yongin-si (KR)

(72) Inventors: Chang Yong Kwon, Suwon-si (KR); Dong Kyun Ryu, Seoul (KR); Yun Sic Bang, Uiwang-si (KR)

(73) Assignee: SOLUM CO., LTD., Yongin-si (KR)

( * ) Notice: Subject to any disclaimer, the term of this patent is extended or adjusted under 35 U.S.C. 154(b) by 897 days.

(21) Appl. No.: 17/648,883

(22) Filed: Jan. 25, 2022

(65) Prior Publication Data

US 2022/0285069 A1 Sep. 8, 2022

(30) Foreign Application Priority Data

Mar. 3, 2021 (KR) ........................ 10-2021-0028356
Jul. 5, 2021 (KR) ........................ 10-2021-0088015

(51) Int. Cl.
*H01F 27/06* (2006.01)
*H01F 27/32* (2006.01)

(52) U.S. Cl.
CPC ........... *H01F 27/06* (2013.01); *H01F 27/325* (2013.01)

(58) Field of Classification Search
CPC ...... H01F 27/06; H01F 27/325; H01F 27/266; H01F 27/306
See application file for complete search history.

(56) References Cited

U.S. PATENT DOCUMENTS

| | | | | |
|---|---|---|---|---|
| 2010/0237972 A1* | 9/2010 | Yen | H01F 27/06 | 336/92 |
| 2013/0092411 A1* | 4/2013 | Chen | H01F 27/292 | 174/50 |
| 2015/0130578 A1* | 5/2015 | Eom | H01F 27/2828 | 336/200 |
| 2015/0279547 A1* | 10/2015 | Park | H05K 1/165 | 336/200 |
| 2017/0032888 A1* | 2/2017 | Park | H01F 27/325 | |
| 2019/0027293 A1* | 1/2019 | Cheon | H01F 27/2804 | |
| 2020/0161043 A1* | 5/2020 | Chou | H01F 27/292 | |
| 2021/0327638 A1* | 10/2021 | Kwon | H01F 27/34 | |
| 2022/0059275 A1* | 2/2022 | Lee | H01F 27/2804 | |

FOREIGN PATENT DOCUMENTS

| | | |
|---|---|---|
| KR | 1020200081195 | 7/2020 |
| KR | 102204749 | 1/2021 |
| WO | 2020138938 | 7/2020 |

* cited by examiner

*Primary Examiner* — Malcolm Barnes
(74) *Attorney, Agent, or Firm* — Perman & Green, LLP

(57) ABSTRACT

A base includes a support plate, an inner wall provided on the support plate, an outer wall arranged apart from the inner wall in a first direction parallel to an upper surface of the support plate, and an insulating cover protruding from the outer wall in the first direction, wherein the outer wall and the inner wall extend in a second direction crossing the first direction.

20 Claims, 25 Drawing Sheets

BASE AND TRANSFORMER DEVICE INCLUDING THE SAME

CROSS-REFERENCE TO RELATED APPLICATIONS

This application is based on and claims priority under 35 U.S.C. § 119 to Korean Patent Application No. 10-2021-0088015, filed on Jul. 5, 2021, in the Korean Intellectual Property Office, and Korean Patent Application No. 10-2021-0028356, filed on Mar. 3, 2021, in the Korean Intellectual Property Office, the disclosures of which are incorporated by reference herein in their entirety.

BACKGROUND

1. Field

The disclosure relates to a base and a transformer device.

2. Description of the Related Art

Electronic devices such as display devices or adapters include a power supply unit that converts an alternating current to a direct current. A power supply unit is basically equipped with a transformer device (or a transformer) for converting an alternating current to a direct current, and a transformer device according to the related art generally has a structure in which a coil is wound around a bobbin and a core is coupled to the bobbin.

Accordingly, the transformer device according to the related art has a limitation in reducing the size of the bobbin because a wire type coil is basically wound around the bobbin. Accordingly, there is a limitation in reducing the total size of the transformer device. Furthermore, when the transformer device is manufactured in a compact size, it is difficult to secure insulation between the primary side and the secondary side.

PRIOR ART DOCUMENTS

Patent Documents (Patent Literature 1) Korean Patent No. 10-2204749 (Coil Part and Manufacturing Method Thereof)

SUMMARY

Provided are a base that secures an insulating distance required between a core and a secondary electronic device and/or between the core and a connector, and a transformer device including the base.

Provided are a base that secures an insulating distance required between a primary electronic device and a secondary electronic device and/or between the primary electronic device and a connector, and a transformer device including the same.

However, the objectives to be solved are not limited the disclosure.

Additional aspects will be set forth in part in the description which follows and, in part, will be apparent from the description, or may be learned by practice of the presented embodiments of the disclosure.

According to an aspect of the disclosure, a base includes a support plate, an inner wall provided on the support plate, an outer wall arranged apart from the inner wall in a first direction parallel to an upper surface of the support plate, and an insulating cover protruding from the outer wall in the first direction, wherein the outer wall and the inner wall extend in a second direction crossing the first direction.

The base may further include a terminal hole provided to a support plate between the outer wall and the inner wall.

The insulating cover may extend along a boundary of the outer wall.

The base may further include a partition wall protruding from the outer wall, wherein the partition wall extends in a third direction crossing the upper surface of the support plate.

The partition wall may extend from the outer wall to a bottom surface of the support plate.

The base may further include a spacer protruding from the bottom surface of the support plate.

The base may further include a partition wall extending from the outer wall to the bottom surface of the support plate, wherein a distance of the partition wall protruding from the bottom surface of the support plate is greater than a distance of the spacer protruding from the bottom surface of the support plate.

The base may further include a vertical support wall provided below the insulating cover, wherein the vertical support wall extends in a third direction crossing the upper surface of the support plate.

According to an aspect of the disclosure, transformer device includes a base including a support plate, an inner wall provided on the support plate, an outer wall arranged apart from the inner wall in a first direction parallel to an upper surface of the support plate, and an insulating cover protruding from the outer wall in the first direction, a core provided on the support plate, and a primary coil and a secondary coil that are magnetically coupled to the core, wherein the outer wall and the inner wall extend in a second direction crossing the first direction.

The base may further include support protrusions protruding from the upper surface of the support plate, and the core may be provided between the inner wall and the support protrusions.

The transformer device may further include a bobbin around which the primary coil and the secondary coil are wound, and the bobbin may be coupled to the core.

The transformer device may further include a main substrate, and a secondary electronic devices provided on the main substrate, wherein the base is provided on the main substrate, and the secondary electronic devices is provided between the main substrate and the insulating cover.

An insulating distance between the core and the secondary electronic devices may be about 6.7 mm or more.

The transformer device may further include a main substrate, and a connector provided between the insulating cover and the main substrate, wherein the base is provided on the main substrate.

The transformer device may further include a vertical support wall provided between the insulating cover and the main substrate, and an auxiliary substrate provided between the vertical support wall and the connector.

The auxiliary substrate may extend in a third direction crossing the upper surface of the support plate and penetrate the main substrate.

The transformer device may further include a main substrate, and a partition wall provided on the outer wall, wherein the base is provided on the main substrate, and the partition wall extends in a third direction crossing the upper surface of the support plate and penetrates the main substrate.

The transformer device may further include a primary electronic device provided on the main substrate, and a secondary electronic device provided at a side opposite to the primary electronic device with respect to the partition wall, wherein the primary electronic device is arranged on a circuit electrically connected to the primary coil, and the secondary electronic device is arranged on a circuit electrically connected to the secondary coil.

The transformer device may further include a spacer provided between the support plate and the main substrate.

The transformer device may further include a terminal hole in a support place between the outer wall and the inner wall, wherein a terminal of the secondary coil is inserted in the terminal hole.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
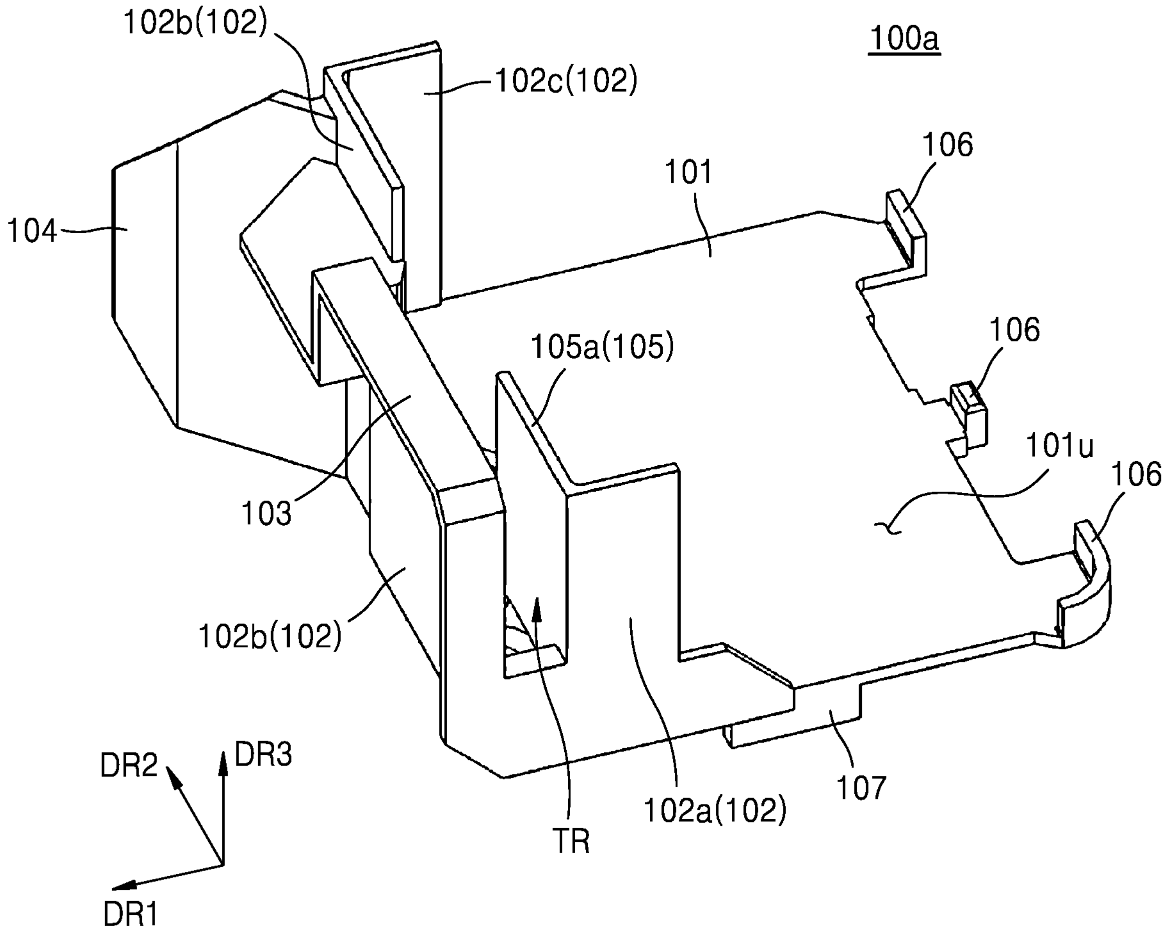
FIG. 1 is a perspective view of a base according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the disclosure will be described in detail by explaining preferred embodiments of the disclosure with reference to the attached drawings. In the accompanying drawings, like reference numerals refer to like elements throughout, and the thickness or size of each layer illustrated in the drawings may be exaggerated for convenience of explanation and clarity. In this regard, the present embodiments may have different forms and should not be construed as being limited to the descriptions set forth herein.

In the descriptions below, when a constituent element is disposed "above" or "on" to another constituent element, the constituent element may be only directly on the other constituent element or above the other constituent elements in a non-contact manner.

The expression of singularity in the specification includes the expression of plurality unless clearly specified otherwise in context. It will also be understood that the terms "comprises," "includes," and "has" used herein specify the presence of stated elements, but do not preclude the presence or addition of other elements, unless otherwise defined.

Furthermore, terms such as a "portion," a "unit," a "module," and a "block" stated in the specification may signify a unit to process at least one function or operation.

Figure 2:
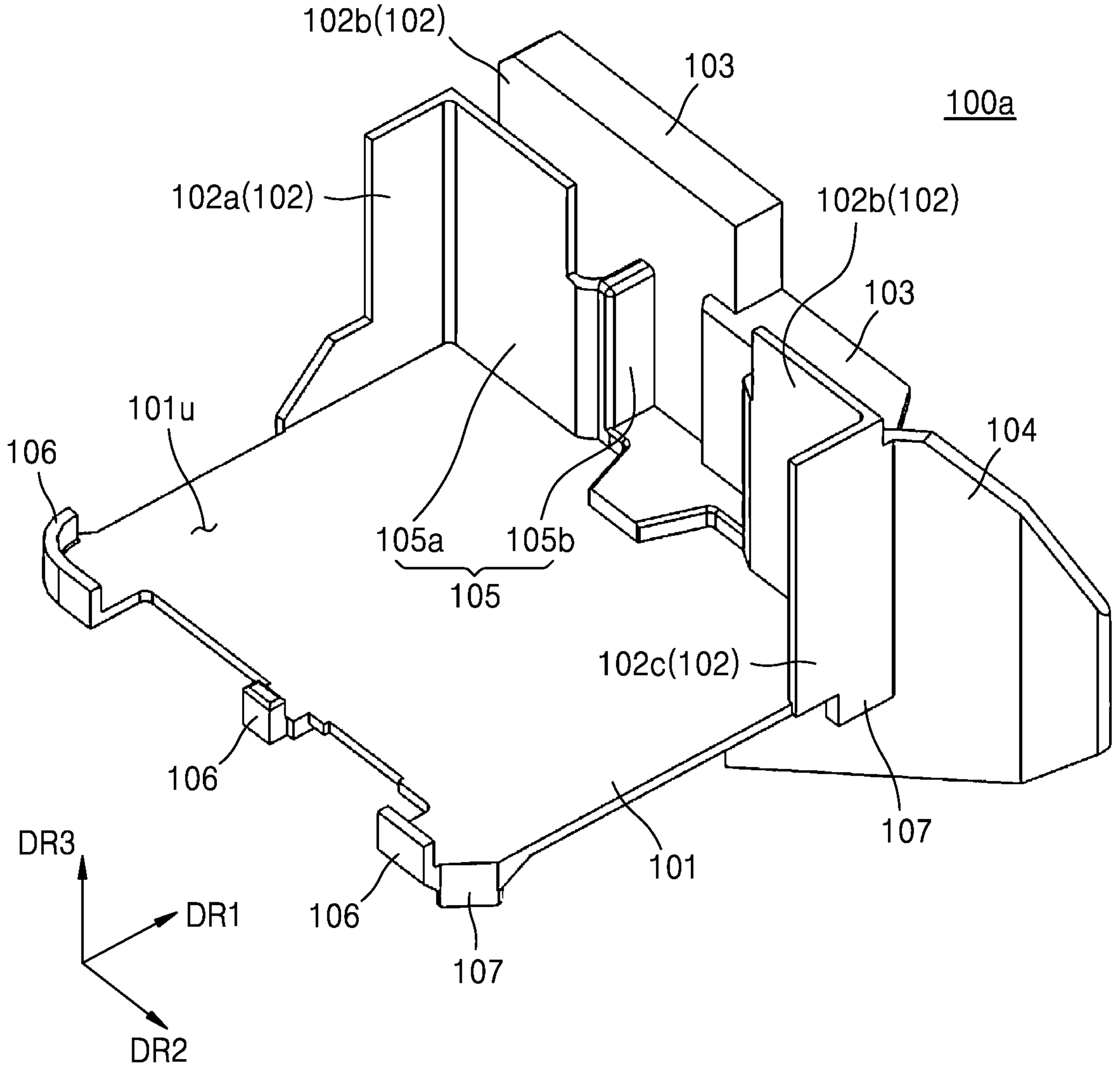
FIG. 2 is another perspective view of the base of FIG. 1.
Figure 3:
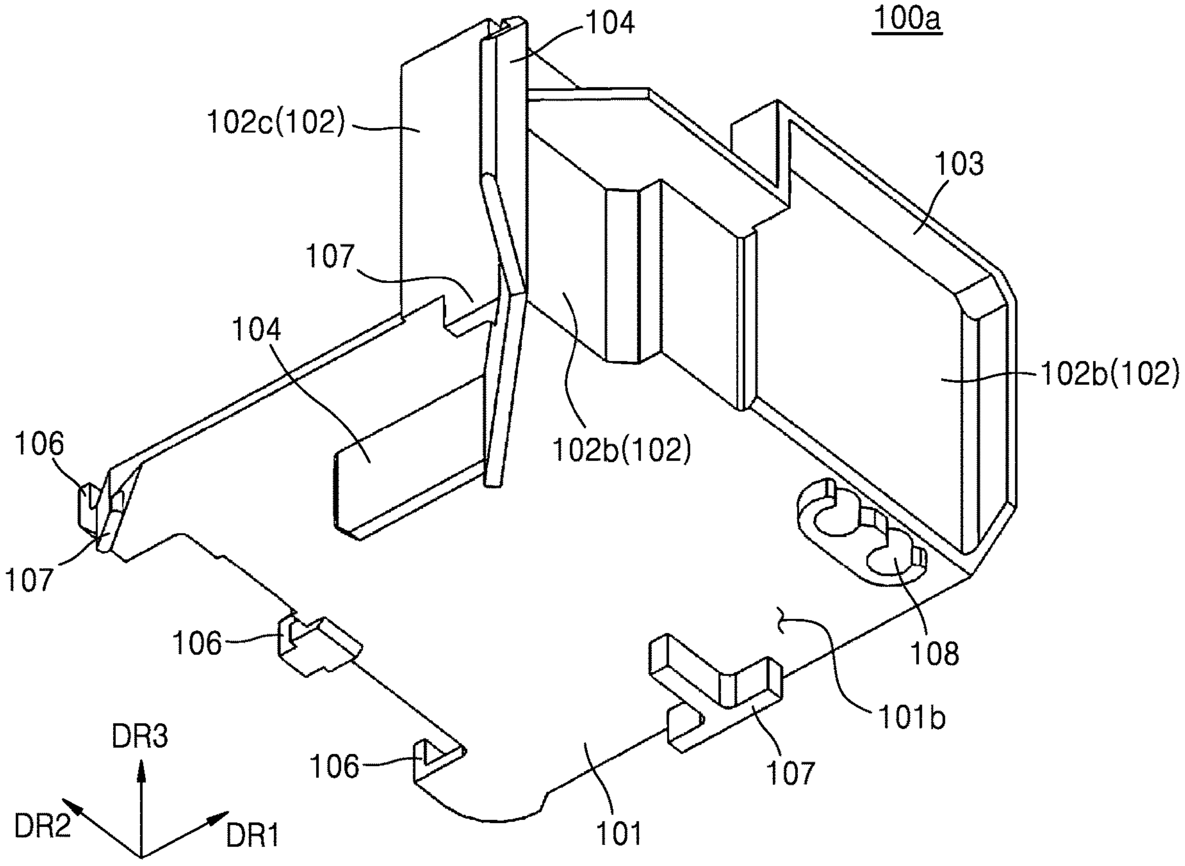
FIG. 3 is another perspective view of the base of FIG. 1.
Figure 4:
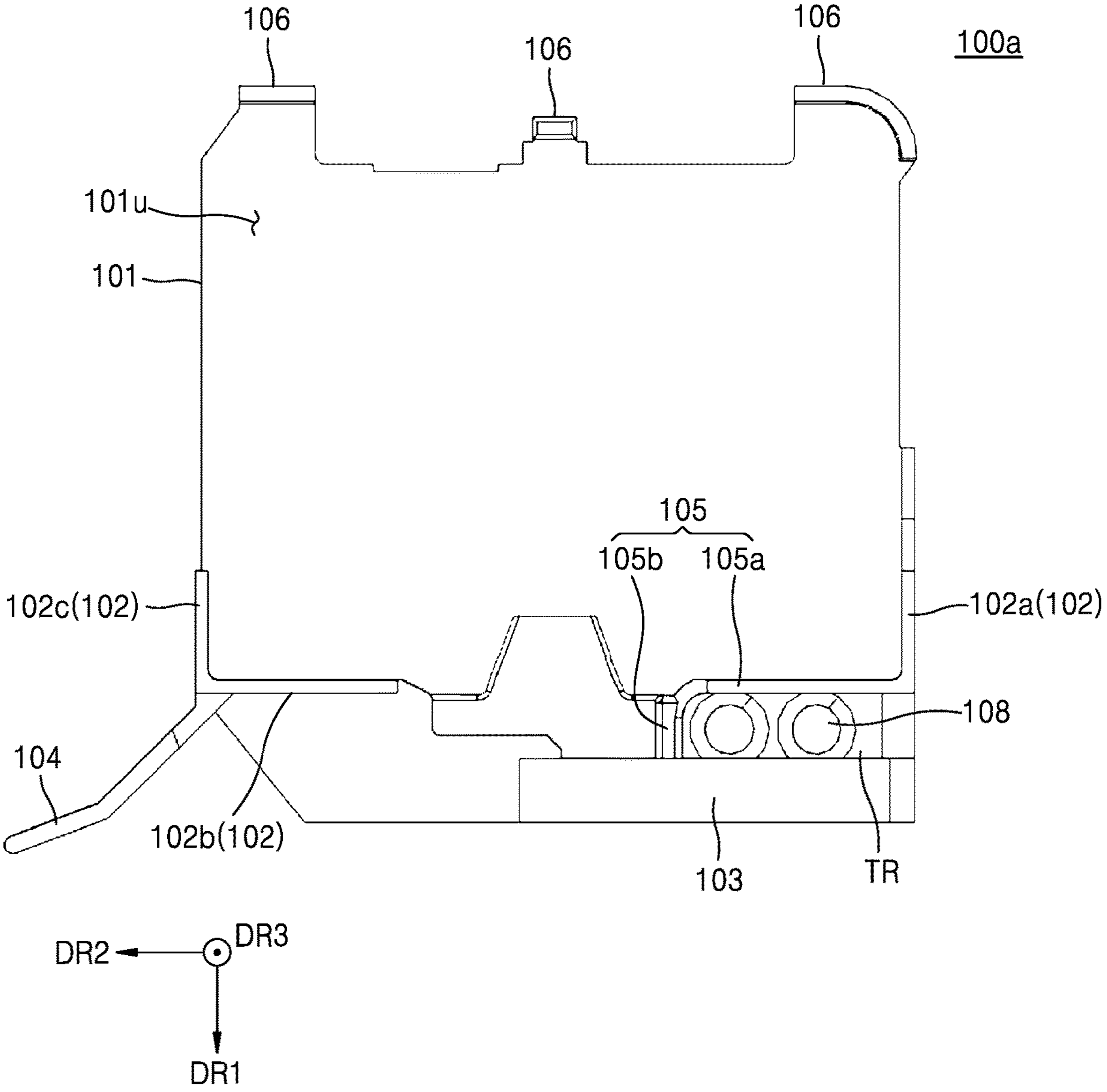
FIG. 4 is a plan view of the base of FIG. 1.
Figure 5:
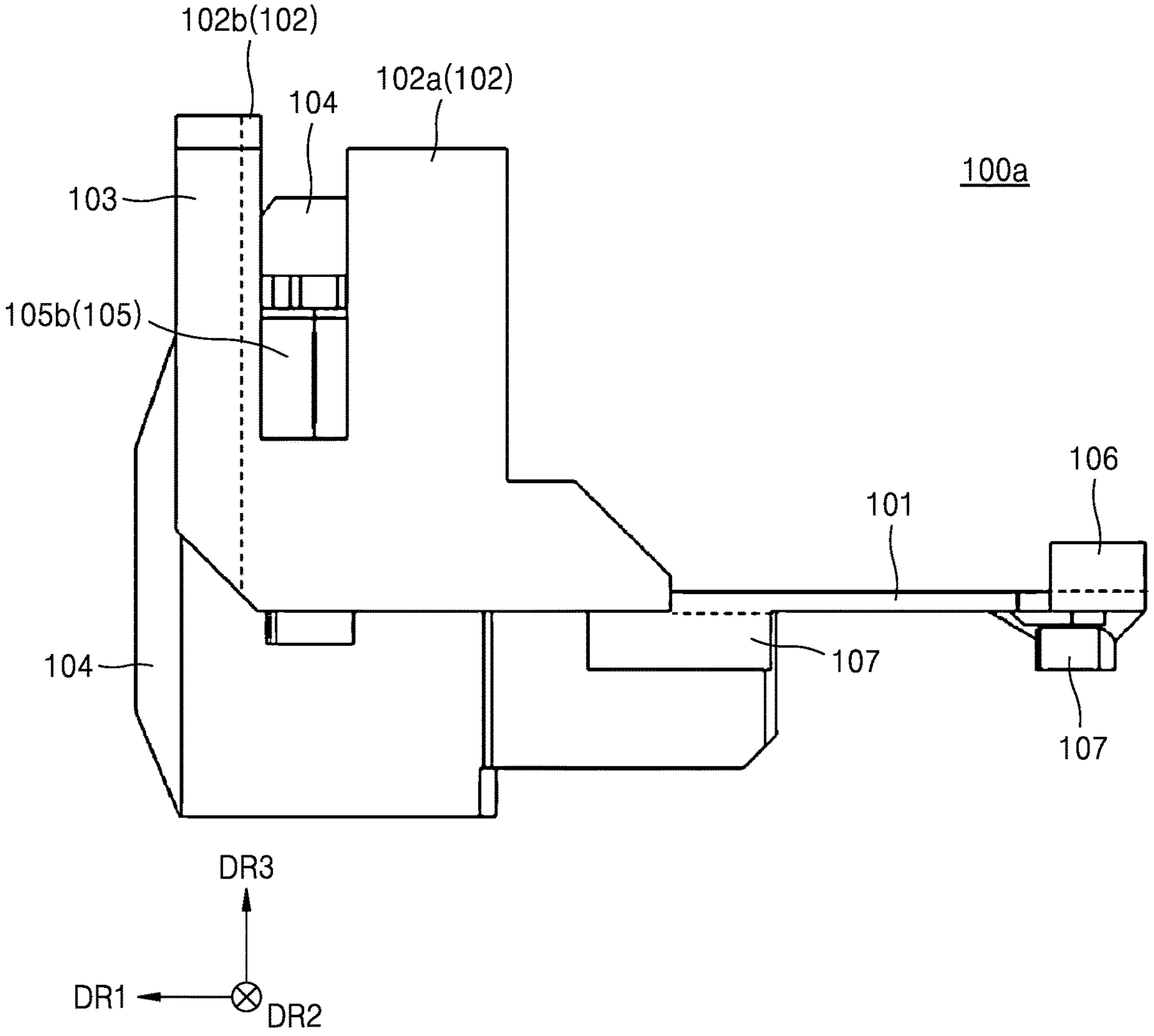
FIG. 5 is a side view of the base of FIG. 1.

FIG. 1 is a perspective view of a base **100*a* according to an embodiment. FIG. 2 is another perspective view of the base 100*a* of FIG. 1. FIG. 3 is another perspective view of the base 100*a* of FIG. 1. FIG. 4 is a plan view of the base 100*a* of FIG. 1. FIG. 5 is a side view of the base 100*a* of FIG. 1**.

Referring to FIGS. 1 to 5, the base **100*a* may be provided. The base 100*a* may be used for a transformer device. For example, the base 100*a*** may support a core that is described below.

The base **100*a* may include a support plate 101, an outer wall 102, an insulating cover 103, a partition wall 104, an inner wall 105, support protrusions 106, and spacers 107. The base 100*a* may have a single structure. The support plate 101, the outer wall 102, the insulating cover 103, the partition wall 104, the inner wall 105, the support protrusions 106, and the spacers 107 may be connected to one another without interfaces therebetween. The base 100*a* may include an insulating material. For example, the base 100*a*** may include insulating plastic.

The support plate 101 may provide an area where the core is placed. The support plate 101 may have a plate shape extending in a first direction DR1 and a second direction DR2. The support plate 101 may have an upper surface **101*u*** and a bottom surface 101_b_ facing in opposite directions to each other. The upper surface 101_u_ of the support plate 101 may face a third direction DR3, and the bottom surface 101_b_ of the support plate 101 may face a direction opposite to the third direction DR3.

The outer wall 102 may be provided at a boundary of the support plate 101. The outer wall 102 may extend along the boundary of the support plate 101. The outer wall 102 may include a first sub-outer wall 102_a_, a second sub-outer wall 102_b_, and a third sub-outer wall 102_c_. The first sub-outer wall 102_a_ and the third sub-outer wall 102_c_ may extend in the first direction DR1 and may be apart from each other in the second direction DR2. The second sub-outer wall 102_b_ may be provided between the first sub-outer wall 102_a_ and the third sub-outer wall 102_c_. The second sub-outer wall 102_b_ may be connected to the first sub-outer wall 102_a_ and the third sub-outer wall 102_c_. The second sub-outer wall 102_b_ may generally extend in the second direction DR2. The outer wall 102 may surround an end portion of the support plate 101 arranged in the first direction DR1. The outer wall 102 may protrude in the third direction DR3 from an upper surface of the support plate 101.

The insulating cover 103 may be provided on a side surface of the second sub-outer wall 102_b_ arranged at the opposite side of the support plate 101. For example, the insulating cover 103 may protrude from the second sub-outer wall 102_b_ in the first direction DR1. The protruding distance of the insulating cover 103 may be determined to be a level or more required by an insulating distance between the core and a secondary electronic device (an electronic device arranged on a circuit electrically connected to a secondary coil), which is described below, and between the core and a connector (a horizontal connector and a vertical connector that are described below). The insulating distance between the two constituent elements may refer to the shortest distance between two constituent elements along a surface of an insulator arranged between two constituent elements. The protruding distance of the insulating cover 103 may be determined such that the insulating distance, for example, a safety standard distance, required between the core and the secondary electronic device and between the core and the connector is secured. For example, the protruding distance of the insulating cover 103 may be determined such that the insulating distance between the core and the secondary electronic device and between the core and the connector is 6.7 mm or more.

The insulating cover 103 may extend along an upper boundary of the second sub-outer wall 102_b_ and a boundary between the first sub-outer wall 102_a_ and the second sub-outer wall 102_b_. The insulating cover 103 provided at the upper boundary of the second sub-outer wall 102_b_ may extend in the second direction DR2. The insulating cover 103 provided at the boundary between the first sub-outer wall 102_a_ and the second sub-outer wall 102_b_ may extend in the third direction DR3.

The insulating distance between the core and the secondary electronic device may be secured by a separation distance between the core and the secondary electronic device and the protruding distance of the insulating cover 103. The insulating distance between the core and the connector may be secured by a separation distance between the core and the connector and the protruding distance of the insulating cover 103. The protruding distance of the insulating cover 103 according to the disclosure may be determined to secure a required insulating distance, corresponding to the separation distance between the core and the secondary electronic device and between the core and the connector. Accordingly, a compact transformer device may be provided.

The partition wall 104 may be arranged on a side surface of the second sub-outer wall 102_b_ from the insulating cover 103 in the second direction DR2. The partition wall 104 may partition an area where primary electronic devices (electronic devices arranged on a circuit electrically connected to a primary coil) are provided and an area where secondary electronic devices are provided. The partition wall 104 may extend from an upper end portion of the second sub-outer wall 102_b_ in a direction opposite to the third direction DR3. The partition wall 104 may extend toward a bottom surface of the support plate 101. The partition wall 104 may protrude from the bottom surface of the support plate 101 in the direction opposite to the third direction DR3. The size of the partition wall 104 may be determined such that an insulating distance between the primary electronic device and the secondary electronic device and between the primary electronic device and the connector, which are described below, are a required level or more. For example, the required level of the insulating distance may be 6.7 mm. Although the partition wall 104 is illustrated as having a portion apart from the insulating cover 103 in the second direction DR2 in an area where the partition wall 104 and the insulating cover 103 are adjacent to each other, this is an example. In another example, in an area where the partition wall 104 and the insulating cover 103 are adjacent to each other, the partition wall 104 and the insulating cover 103 may be completely in contact with each other in the second direction DR2.

The inner wall 105 may be provided on the support plate 101. The inner wall 105 may extend from the first sub-outer wall 102_a_ to the second sub-outer wall 102_b_. The inner wall 105 may include a first sub-inner wall 105_a_ extending from the first sub-outer wall 102_a_ in the second direction DR2 and a second sub-inner wall 105_b_ extending from the first sub-inner wall 105_a_ in the first direction DR1 and in contact with the second sub-outer wall 102_b_. The height of the second sub-inner wall 105_b_ may be less than the height of the first sub-inner wall 105_a_. An area between the inner wall 105, the first sub-outer wall 102_a_, and the second sub-outer wall 102_b_ may be referred to as a terminal region TR. The terminal region TR may be a region where a pair of terminals of the secondary coil is provided. The support plate 101 may be exposed in the terminal region TR. A pair of terminal holes 108 may be provided in the support plate 101 that is exposed in the terminal region TG. The pair of terminal holes 108 may be holes in which terminals of the secondary coil is inserted. The pair of terminal holes 108 may penetrate the support plate 101.

The support protrusions 106 may be provided at the opposite to the second sub-outer wall 102_b_ with respect to the support plate 101. The support protrusions 106 may be provided at a boundary of the support plate 101 arranged at the opposite to the second sub-outer wall 102_b_. The support protrusions 106 may protrude from the upper surface of the support plate 101 in the third direction DR3. The core may be arranged between the support protrusions 106, the outer wall 102, and the inner wall 105. The support protrusions 106, the outer wall 102, and the inner wall 105 may prevent the core from being detached from the base 100_a_ during an assembly process of the core and the base 100_a_.

The spacers 107 may be provided on the bottom surface of the support plate 101. The spacers 107 may protrude from the bottom surface of the support plate 101 in a direction opposite to the third direction DR3. The protruding distance of the spacers 107 may be determined such that the support plate 101 and a main substrate that is described below are apart from each other by the separation distance. For example, a required separation distance between the support plate 101 and the main substrate may be greater than a thickness of electronic devices arranged between the support plate 101 and the main substrate. The protruding distance of the spacers 107 may be less than a distance of the partition wall 104 protruding from the bottom surface of the support plate 101. In other words, on the bottom surface of the support plate 101, the size of the spacers 107 in the third direction DR3 may be less than the size of the partition wall 104 in the third direction DR3. Accordingly, when the spacers 107 are in contact with the main substrate, the partition wall 104 may penetrate the main substrate.

When the base 100*a* is applied to the transformer device, the core may be arranged on the support plate 101, and the secondary electronic devices may be arranged at the outside of the outer wall 102, that is, at the opposite side of the support plate 101 with respect to the outer wall 102. A certain insulating distance may be between the core and the secondary electronic devices. For example, a certain insulating distance may be an insulating distance, that is, the safety standard distance, at least regulated in a safety standard.

The insulating distance required between the core and the secondary electronic devices and between the core and the connector may be secured by the insulating cover 103 according to the disclosure. The insulating distance required between the primary electronic device and the secondary electronic device and between the primary electronic device and the connector may be secured by the partition wall 104. The base 100*a* may miniaturize the transformer device.

Figure 6:
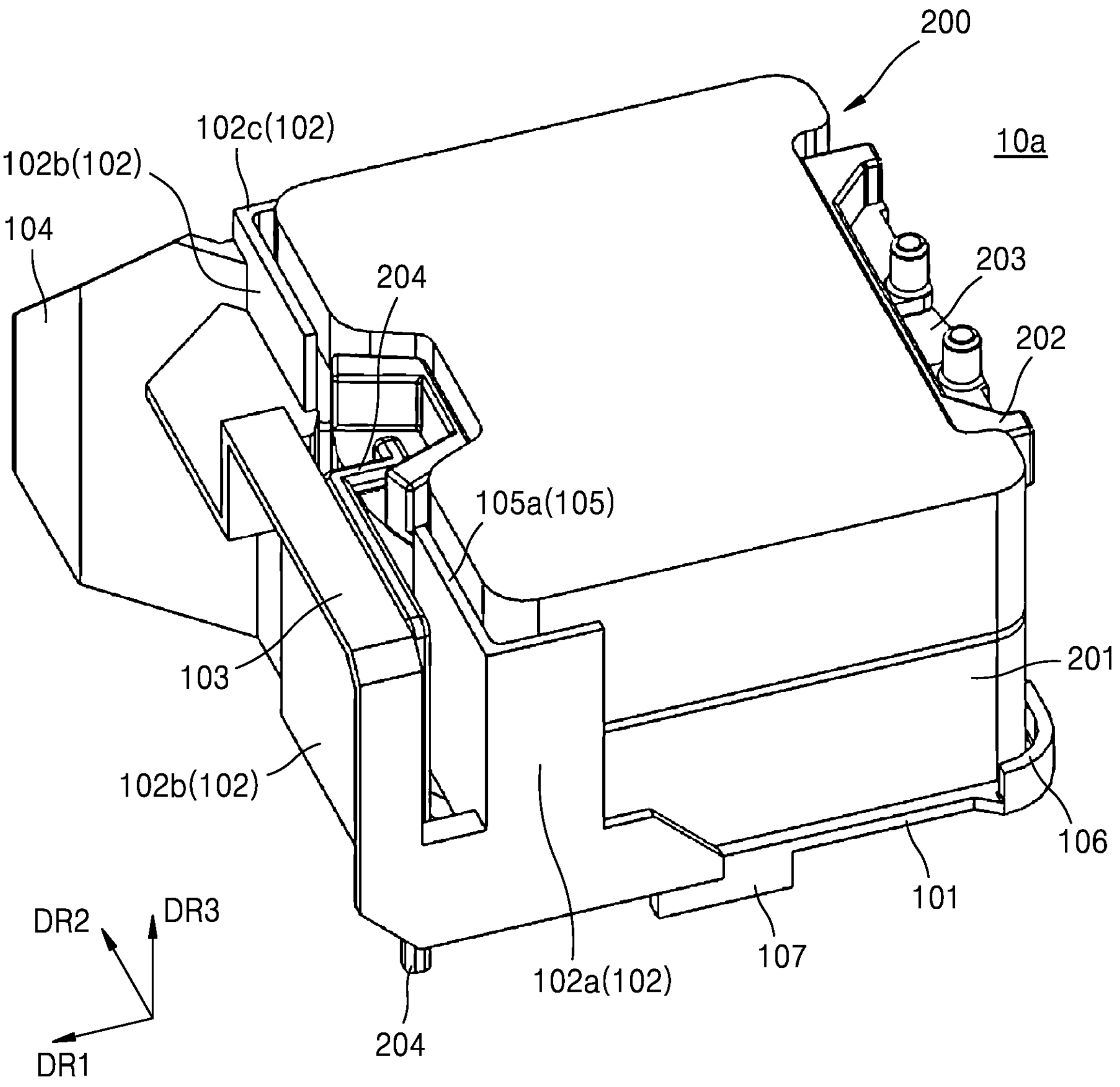
FIG. 6 is a perspective view of a sub-transformer device according to an embodiment.
Figure 7:
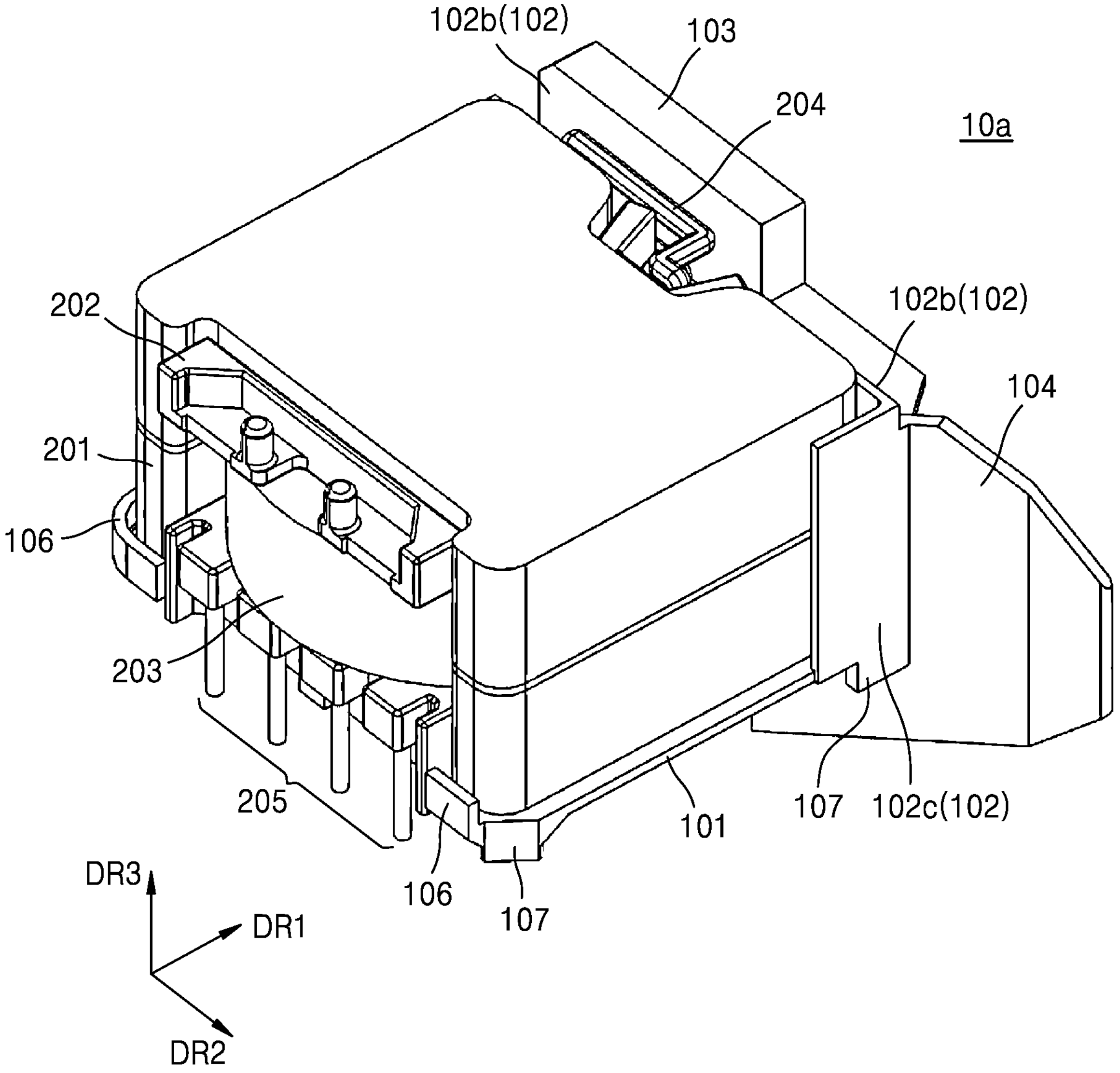
FIG. 7 is another perspective view of the sub-transformer device of FIG. 6.
Figure 8:
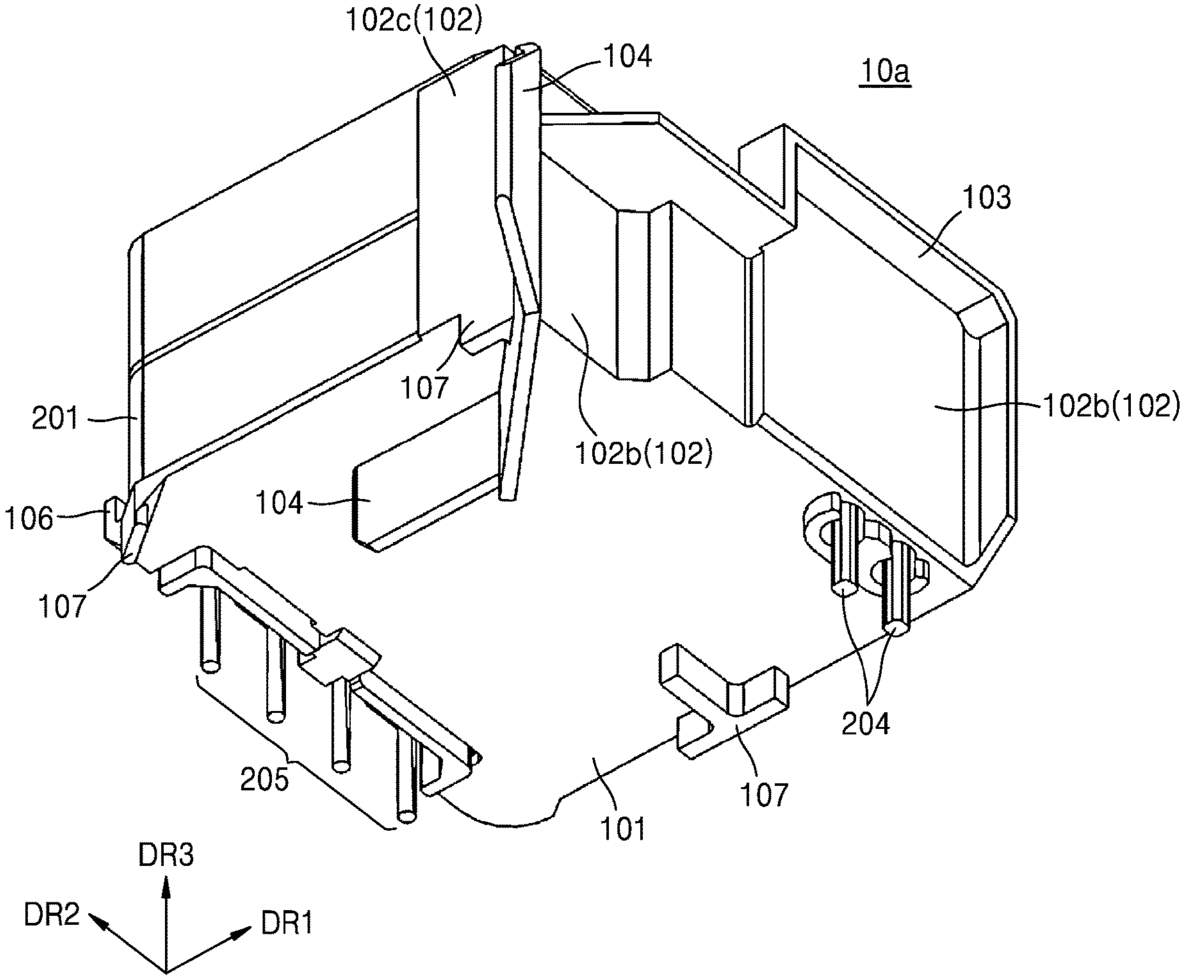
FIG. 8 is another perspective view of the sub-transformer device of FIG. 6.
Figure 9:
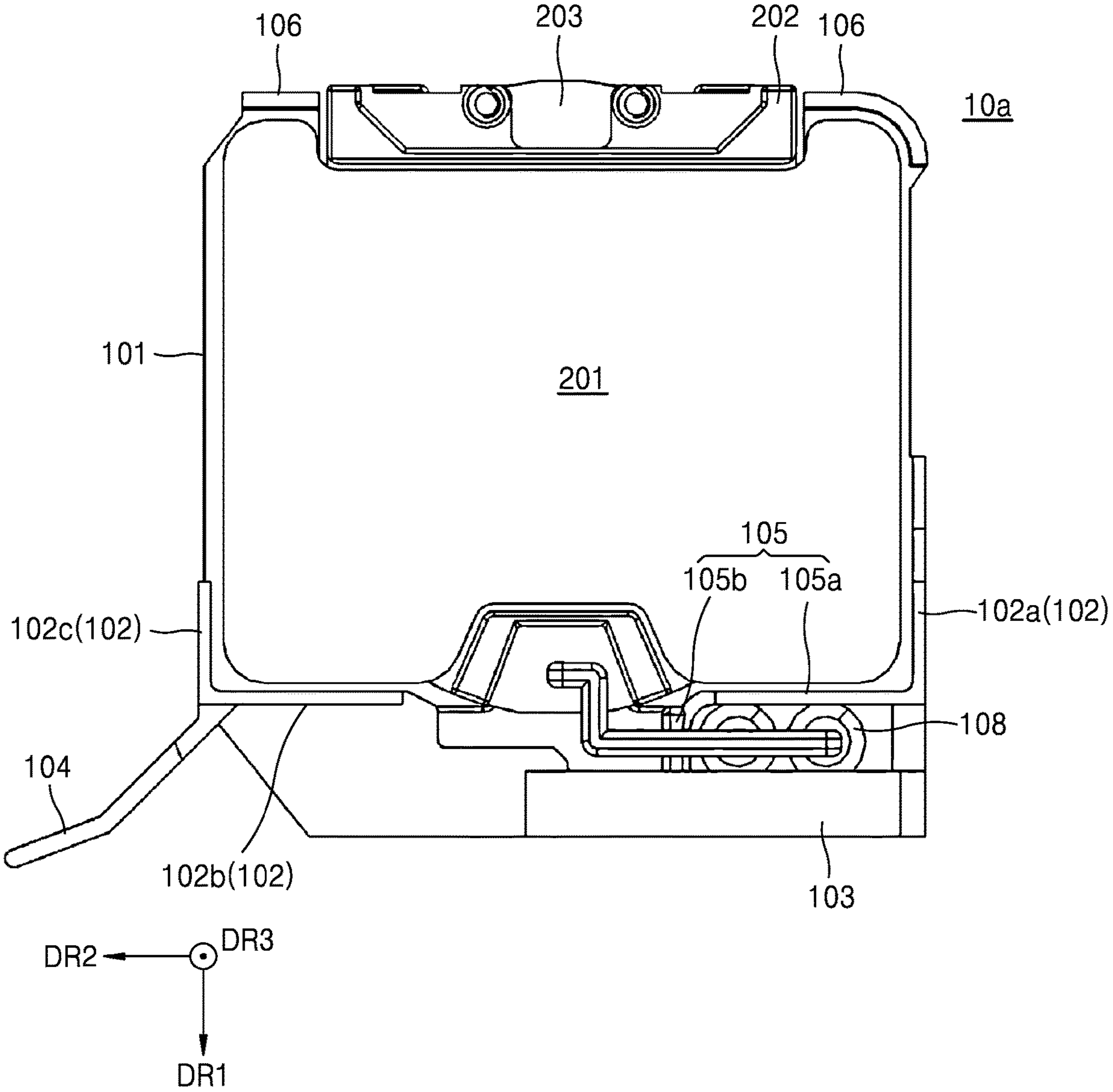
FIG. 9 is a plan view of the sub-transformer device of FIG. 6.
Figure 10:
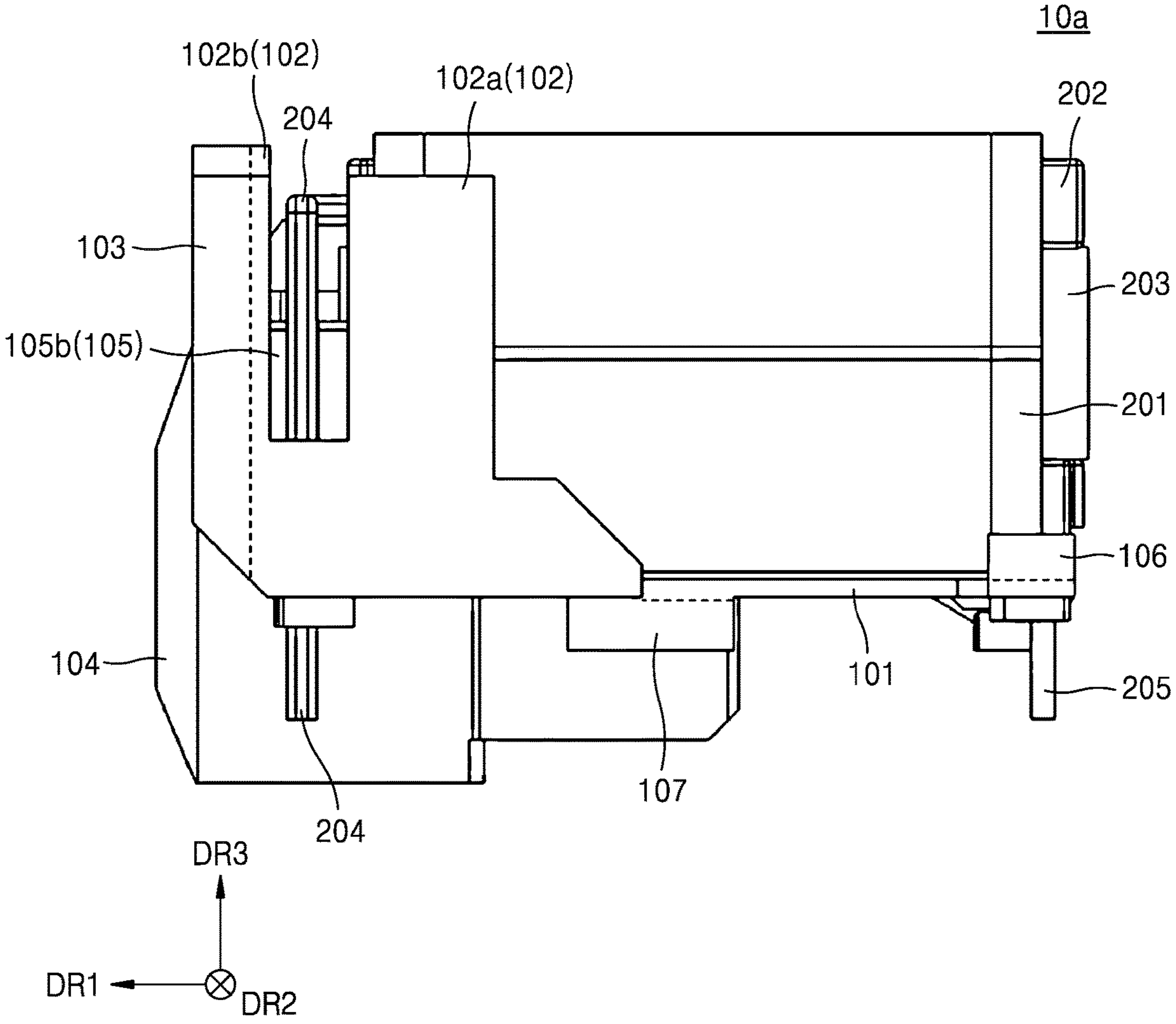
FIG. 10 is a side view of the sub-transformer device of FIG. 6.

FIG. 6 is a perspective view of a sub-transformer device according to an embodiment. FIG. 7 is another perspective view of the sub-transformer device of FIG. 6. FIG. 8 is another perspective view of the sub-transformer device of FIG. 6. FIG. 9 is a plan view of the sub-transformer device of FIG. 6. FIG. 10 is a side view of the sub-transformer device of FIG. 6. For simplicity of explanation, descriptions that are substantially the same as those described with reference to FIGS. 1 to 5 may be omitted.

Referring to FIGS. 6 to 10, a sub-transformer device 10*a* may be provided. The sub-transformer device 10*a* may include the base 100*a*, a core 201, a bobbin 202, and a coil 203. The base 100*a* may be substantially the same as the base 100*a* described with reference to FIGS. 1 to 5.

The core 201 may be provided on the support plate 101. The core 201 may be provided between the outer wall 102, the inner wall 105, and the support protrusions 106. The core 201 may include ferrite. For example, the core 201 may include a nickel (Ni)-based ferrite core or a manganese (Mn)-based ferrite core. The core 201 may exhibit a high permeability, a low loss, a high saturation magnetic flux density, high stability, and low production costs. The core 201 may be formed by combining an upper core and a lower core. The shape of the core 210 may be determined according to the necessity For example, the core 201 may have an E-E type, an E-I type, a U-U type, or a U-I type. The core 201 and the secondary electronic devices may have a certain insulating distance therebetween. For example, the certain insulating distance may be an insulating distance at least regulated in the safety standard. The insulating distance between the core 201 and the secondary electronic devices may be increased by the insulating cover 103.

The bobbin 202 may be provided in the core 201. The bobbin 202 may be configured such that the coil 203 is wound around the core 201. For example, the bobbin 202 may be coupled to the core 201. The shape of the bobbin 202 may be determined according to the necessity. The bobbin 202 may include an insulating material. For example, the bobbin 202 may include insulating plastic. However, in another example, the bobbin 202 may not be provided.

The coil 203 may be magnetically coupled to the core 201. The coil 203 may be wound around the bobbin 202. When the bobbin 202 is not provided, the coil 203 may be directly wound around the core 201. The coil 203 may include a primary coil and a secondary coil. The number of windings of the primary coil and the secondary coil may be determined according to the necessity. Terminals 204 of the secondary coil may be provided to the terminal region TR. The terminals 204 of the secondary coil may pass an area on the second sub-inner wall 105*b*. The terminals 204 of the secondary coil may be inserted in terminal holes 108. The terminals 204 of the secondary coil may protrude from the bottom surface of the support plate 101 by passing through the support plate 101. The terminals 205 of the primary coil may be arranged outside the support plate 101. The terminals 205 of the primary coil may protrude from the bottom surface of the support plate 101. On the bottom surface of the support plate 101, protruding distances of the terminals 205 of the primary coil and the terminals 204 of the secondary coil may be greater than the protruding distance of the spacers 107. Accordingly, when the sub-transformer device 10*a* is arranged on the main substrate that is described below, the terminals 205 of the primary coil and the terminals 204 of the secondary coil may penetrate the main substrate.

The disclosure may provide the sub-transformer device 10*a* that secures the required insulating distance.

Figure 11:
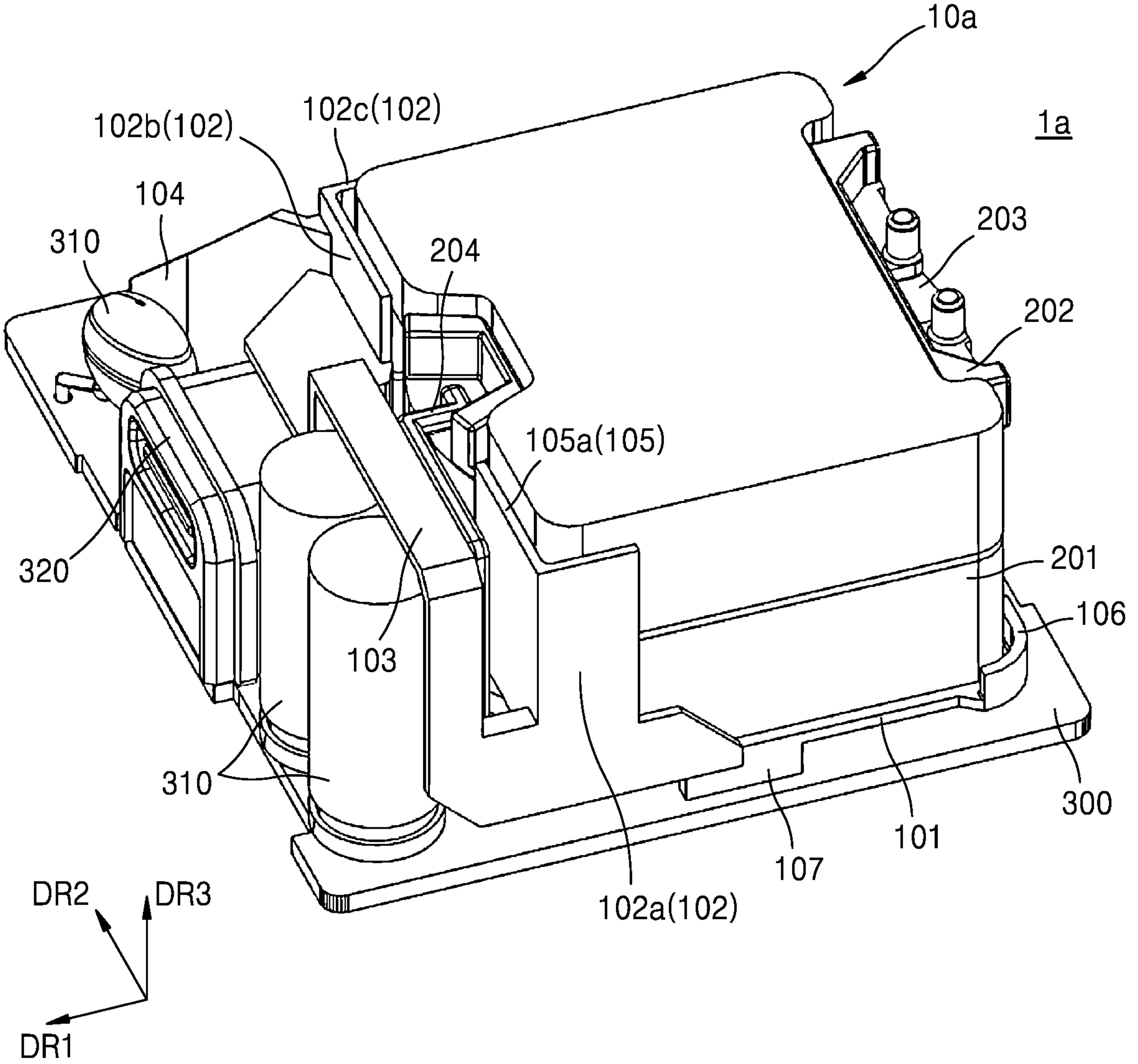
FIG. 11 is a perspective view of a transformer device according to an embodiment.
Figure 12:
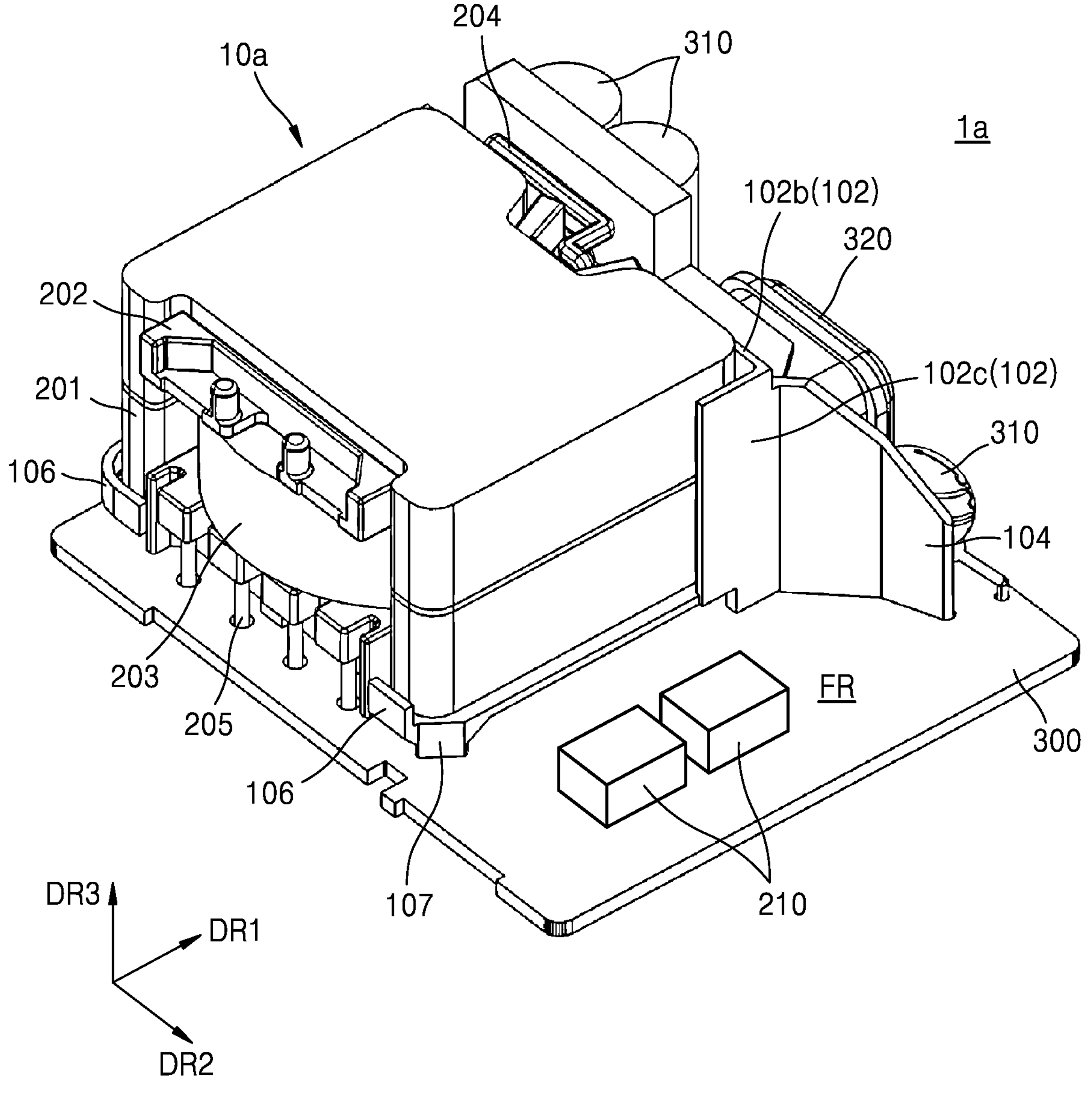
FIG. 12 is another perspective view of the transformer device of FIG. 11.
Figure 13:
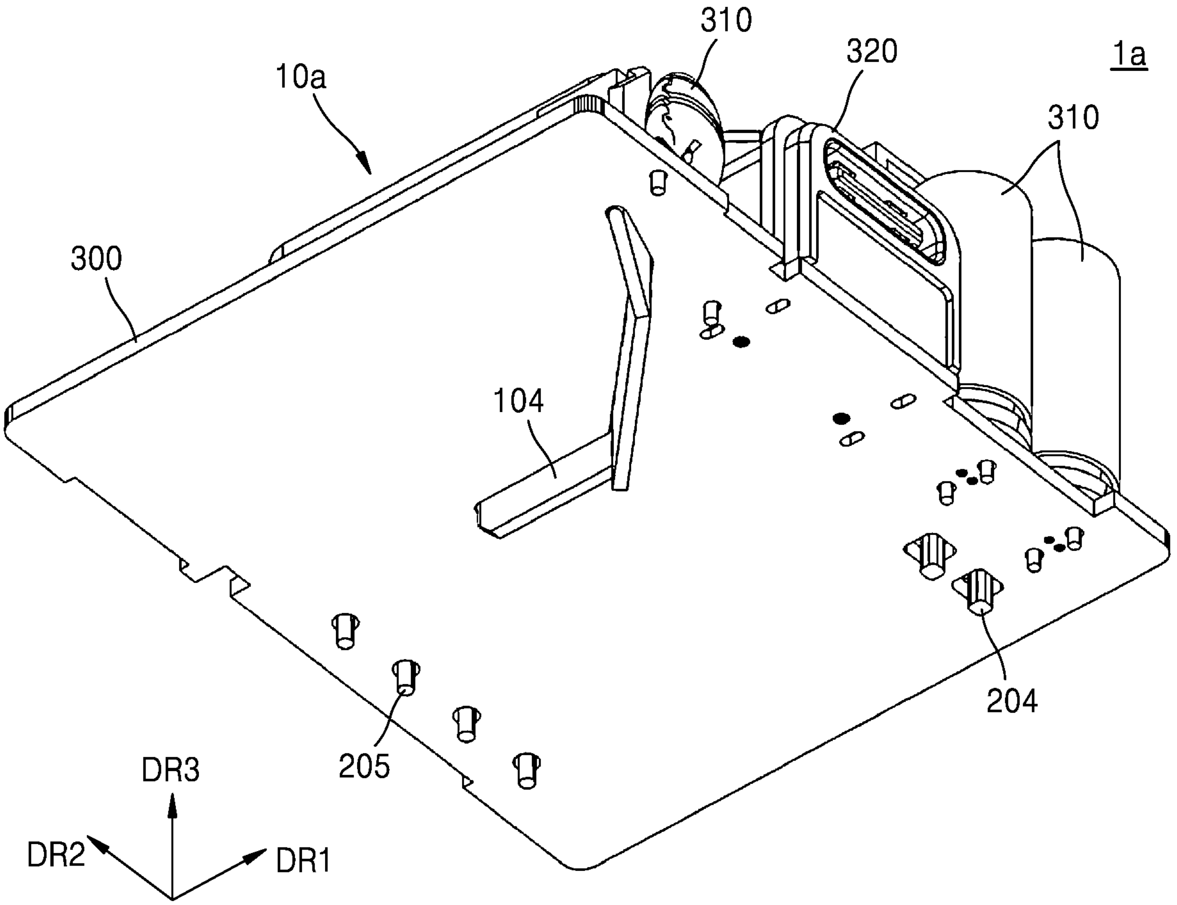
FIG. 13 is another perspective view of the transformer device of FIG. 11.
Figure 14:
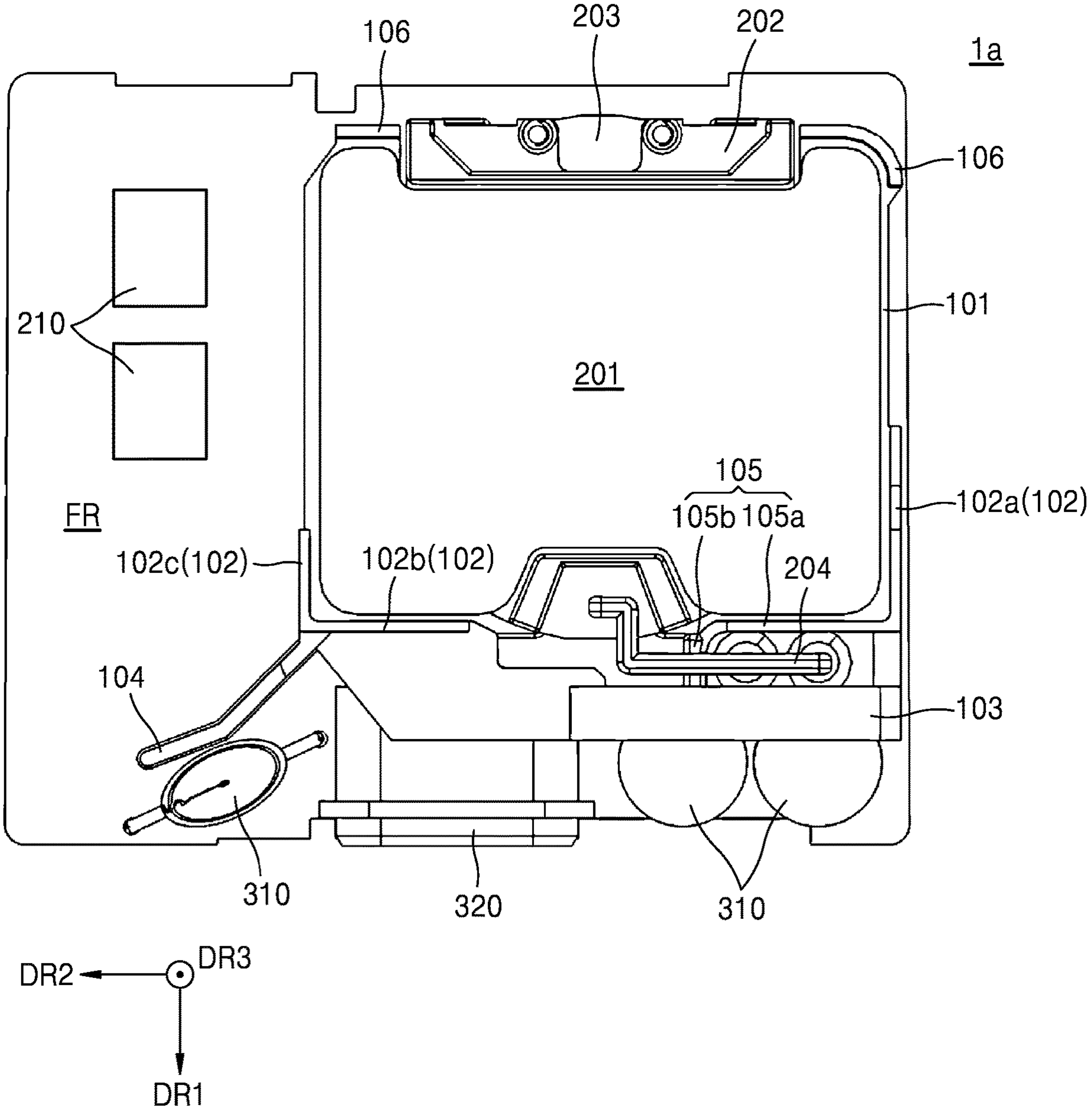
FIG. 14 is a plan view of the transformer device of FIG. 11.

FIG. 11 is a perspective view of a transformer device 1*a* according to an embodiment. FIG. 12 is another perspective view of the transformer device 1*a* of FIG. 11. FIG. 13 is another perspective view of the transformer device 1*a* of FIG. 11. FIG. 14 is a plan view of the transformer device 1*a* of FIG. 11. For simplicity of explanation, descriptions that are substantially the same as those described with reference to FIGS. 6 to 10 may be omitted.

Referring to FIGS. 11 to 14, the transformer device 1*a* may be provided. The transformer device 1*a* may include a main substrate 300, the sub-transformer device 10*a*, primary electronic devices 210, secondary electronic devices 310, and a horizontal connector 320. For example, the main substrate 300 may be a printed circuit board. The main substrate 300 may extend in the first direction DR1 and in the second direction DR2. The main substrate 300 may include a primary region FR and a secondary region. The primary region FR may be a region where the primary electronic devices 210 electrically connected to a primary coil circuit are arranged. The secondary region may be a region where the secondary electronic devices 310 electrically connected to a secondary coil circuit and the horizontal connector 320 are arranged. The horizontal connector 320 may be a portion where a terminal of an electronic device is connected to the transformer device 1*a*. The horizontal connector 320 may extend in the second direction DR2. For example, the horizontal connector 320 may include pins of a C-type USB extending in the second direction DR2.

The sub-transformer device 10*a* may be provided on the main substrate 300. The sub-transformer device 10*a* may be substantially the same as that described with reference to FIGS. 6 to 10.

The insulating cover 103 may cover the horizontal connector 320 and the secondary electronic devices 310. The insulating cover 103 may be configured to secure the insulating distance, for example, the safety standard distance, required between the core 201 and the secondary electronic devices 310 and between the core 201 and the horizontal connector 320. For example, the protruding distance of the insulating cover 103 measured from the outer wall 102 may be determined such that the insulating distance between the core 201 and the secondary electronic devices 310 and between the core 201 and the horizontal connector 320 is 6.7 mm or more.

The spacers 107 may be in contact with an upper surface of the main substrate 300. In an example, electronic devices (not shown) may be provided between the support plate 101 and the main substrate 300. The partition wall 104 may penetrate the main substrate 300. An insulating distance between the primary electronic devices 210 and the secondary electronic devices 310 may be a length along a surface of the partition wall 104. The insulating distance may be greater when the partition wall 104 penetrates the main substrate 300 than when the partition wall 104 is provided only on the upper surface of the main substrate 300. The partition wall 104 may be determined such that the insulating distance, for example, the safety standard distance, required between the primary electronic devices 210 and the secondary electronic devices 310 and between the primary electronic devices 210 and the horizontal connector 320 is secured. For example, the size of the partition wall 104 may be determined such that the insulating distance between the primary electronic devices 210 and the secondary electronic devices 310 and between the primary electronic devices 210 and the horizontal connector 320 is 6.7 mm or more.

The disclosure may provide the transformer device 1*a* that secures the insulating distance required between the core 201 and the secondary electronic devices 310, between the core 201 and the horizontal connector 320, between the primary electronic devices 210 and the secondary electronic devices 310, and between the primary electronic devices 210 and the horizontal connector 320.

Figure 15:
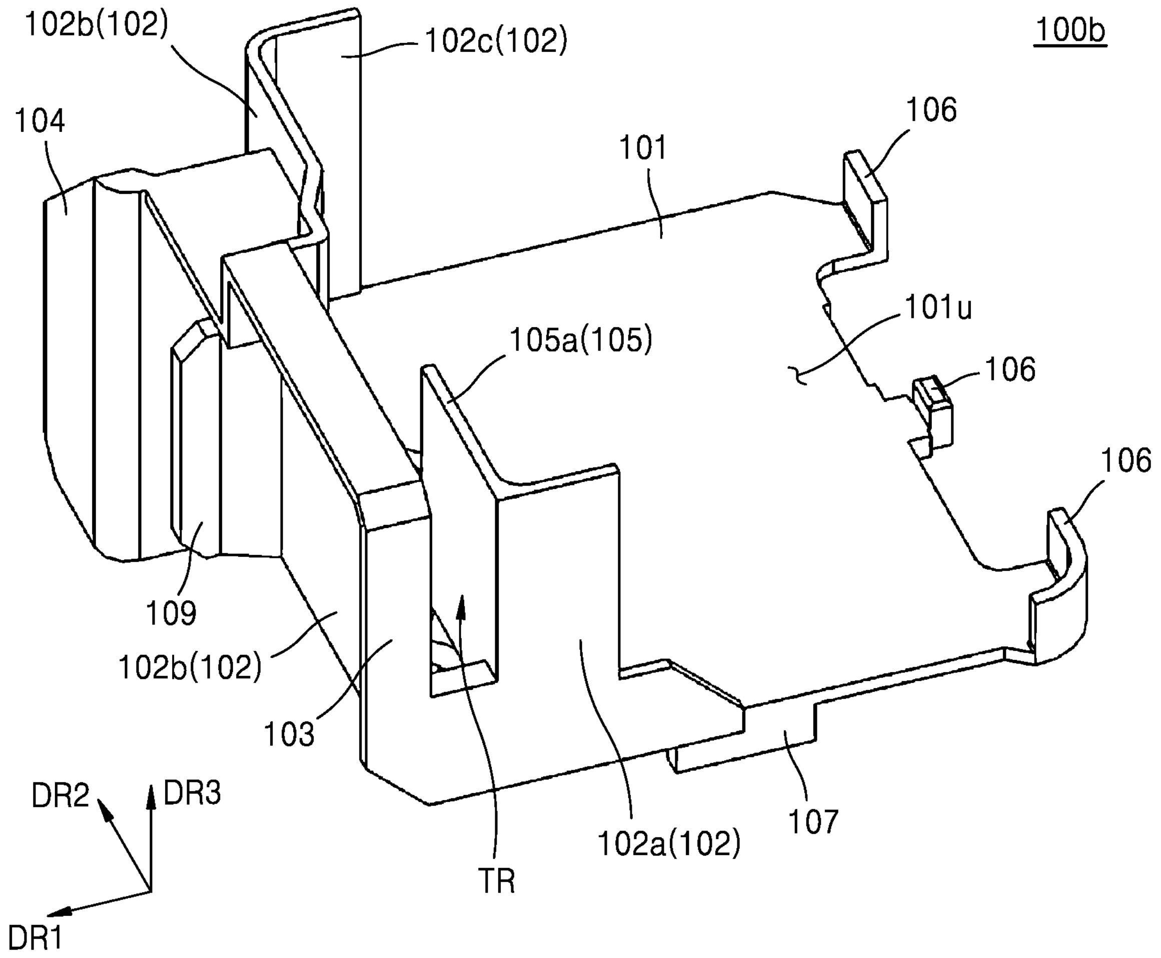
FIG. 15 is a perspective view of a base according to an embodiment.
Figure 16:
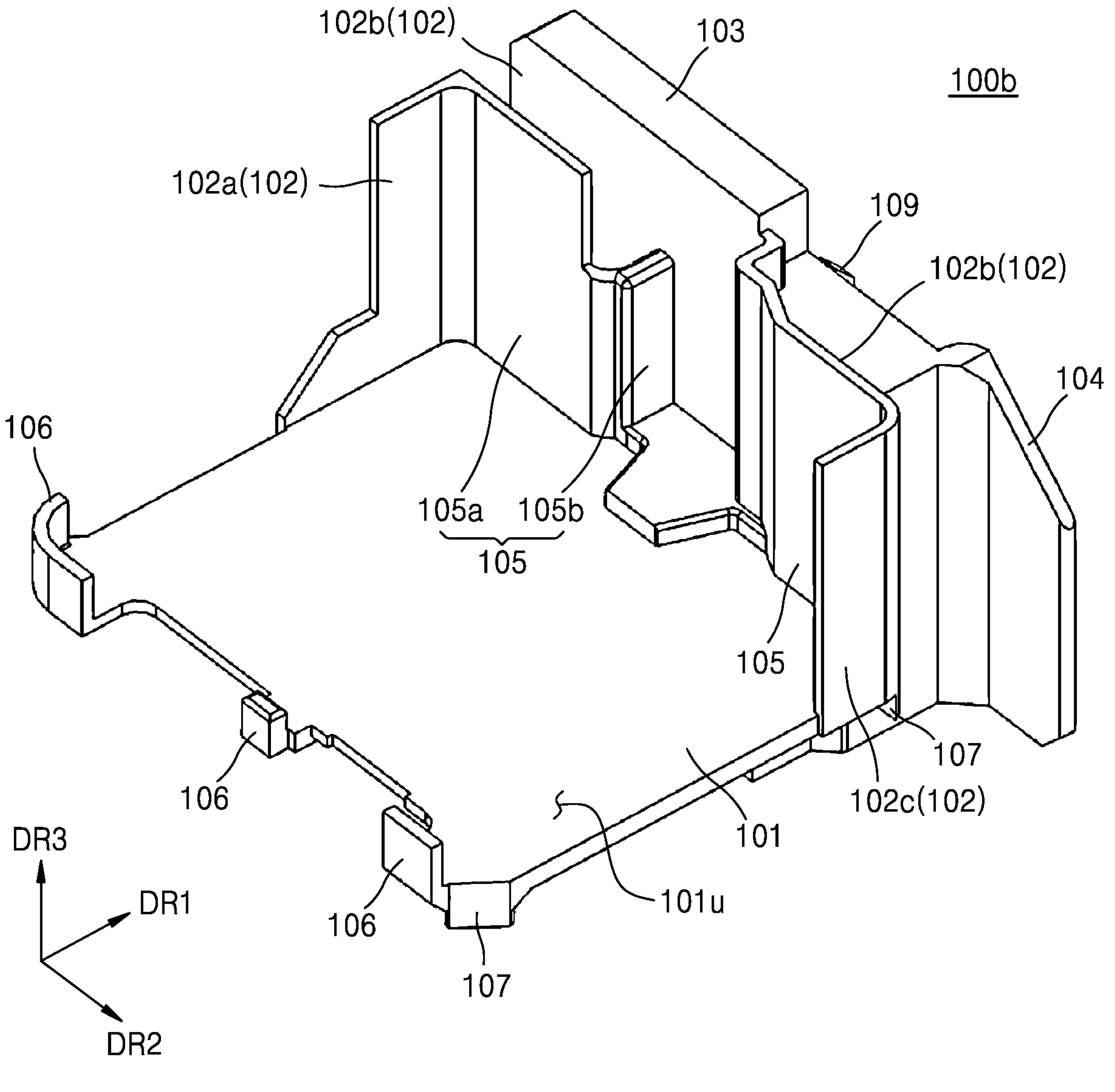
FIG. 16 is another perspective view of the base of FIG. 15.
Figure 17:
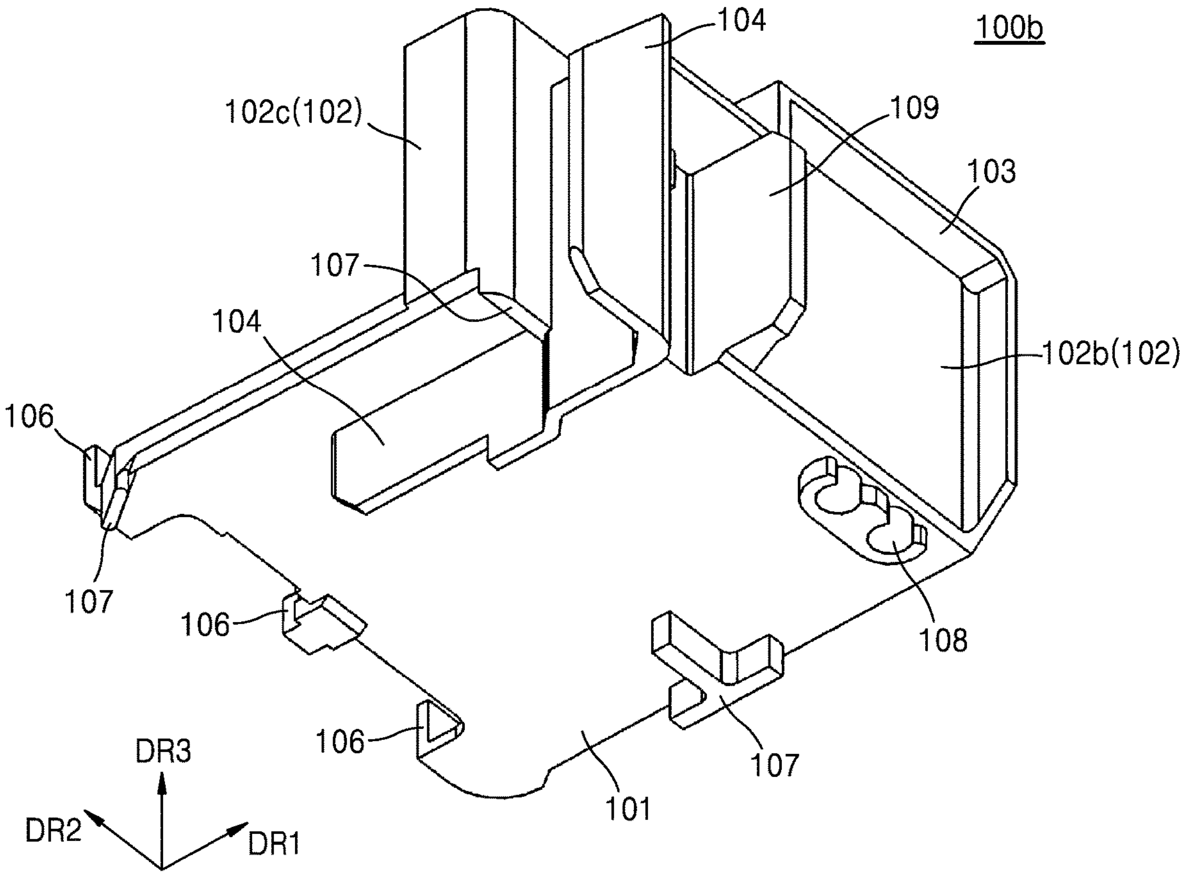
FIG. 17 is another perspective view of the base of FIG. 15.

FIG. 15 is a perspective view of a base 100*b* according to an embodiment. FIG. 16 is another perspective view of the base 100*b* of FIG. 15. FIG. 17 is another perspective view of the base 100*b* of FIG. 15. For simplicity of explanation, descriptions that are substantially the same as those described with reference to FIGS. 1 to 5 may be omitted.

Referring to FIGS. 15 to 17, the base 100*b* may be provided. The base 100*b* may further include a vertical support wall 109 unlike the base 100*b* described with reference to FIGS. 1 to 5. The vertical support wall 109 may be provided on the side surface of the second sub-outer wall 102*b* below the insulating cover 103. The vertical support wall 109 may extend in the third direction DR3. An upper end of the vertical support wall 109 may be in contact with the insulating cover 103. The vertical support wall 109 may support a vertical connector that is described below, and divide areas where the vertical connector and the secondary electronic devices are provided.

Although, unlike the illustrations of FIGS. 1 to 5, the insulating cover 103 extends in the second direction DR2 and completely in contact with the partition wall 104, this is an example. In another example, the insulating cover 103, as illustrated in FIGS. 1 to 5, may extend in the second direction DR2 and partially in contact with the partition wall 104.

Although the shape of the partition wall 104 is illustrated to be different from that illustrated in FIGS. 1 to 5, this is an example. In another example, the shape of the partition wall 104 may be substantially the same as the shape of the partition wall 104 of FIGS. 1 to 5.

The insulating distance required between the core and the secondary electronic devices and between the core and the connector may be secured by the insulating cover 103 according to the disclosure. The insulating distance required between the primary electronic device and the secondary electronic device and between the primary electronic device and the connector may be secured by the partition wall 104. The base 100*b* may enable miniaturization of a transformer device.

Figure 18:
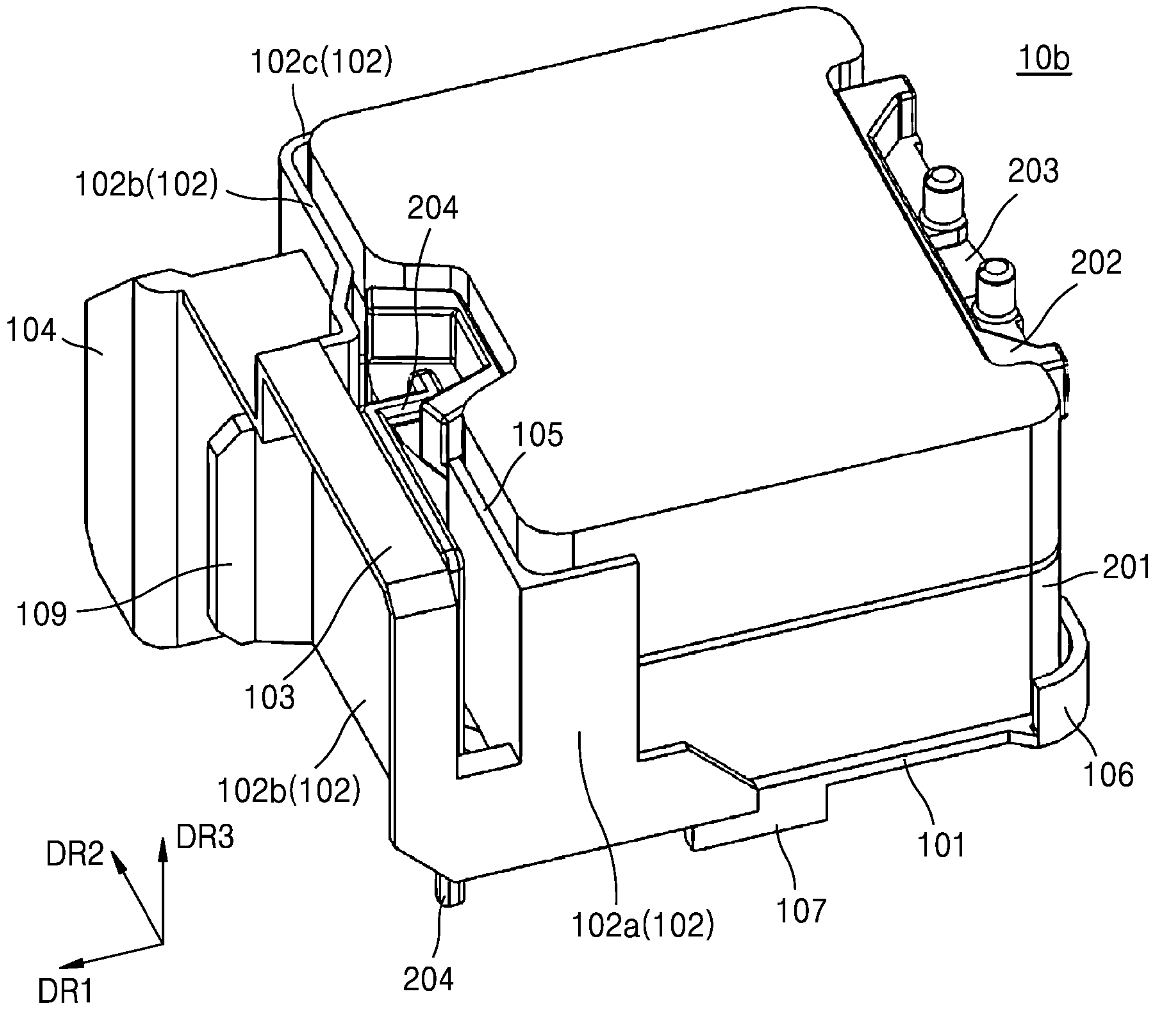
FIG. 18 is a perspective view of a sub-transformer device according to an embodiment.
Figure 19:
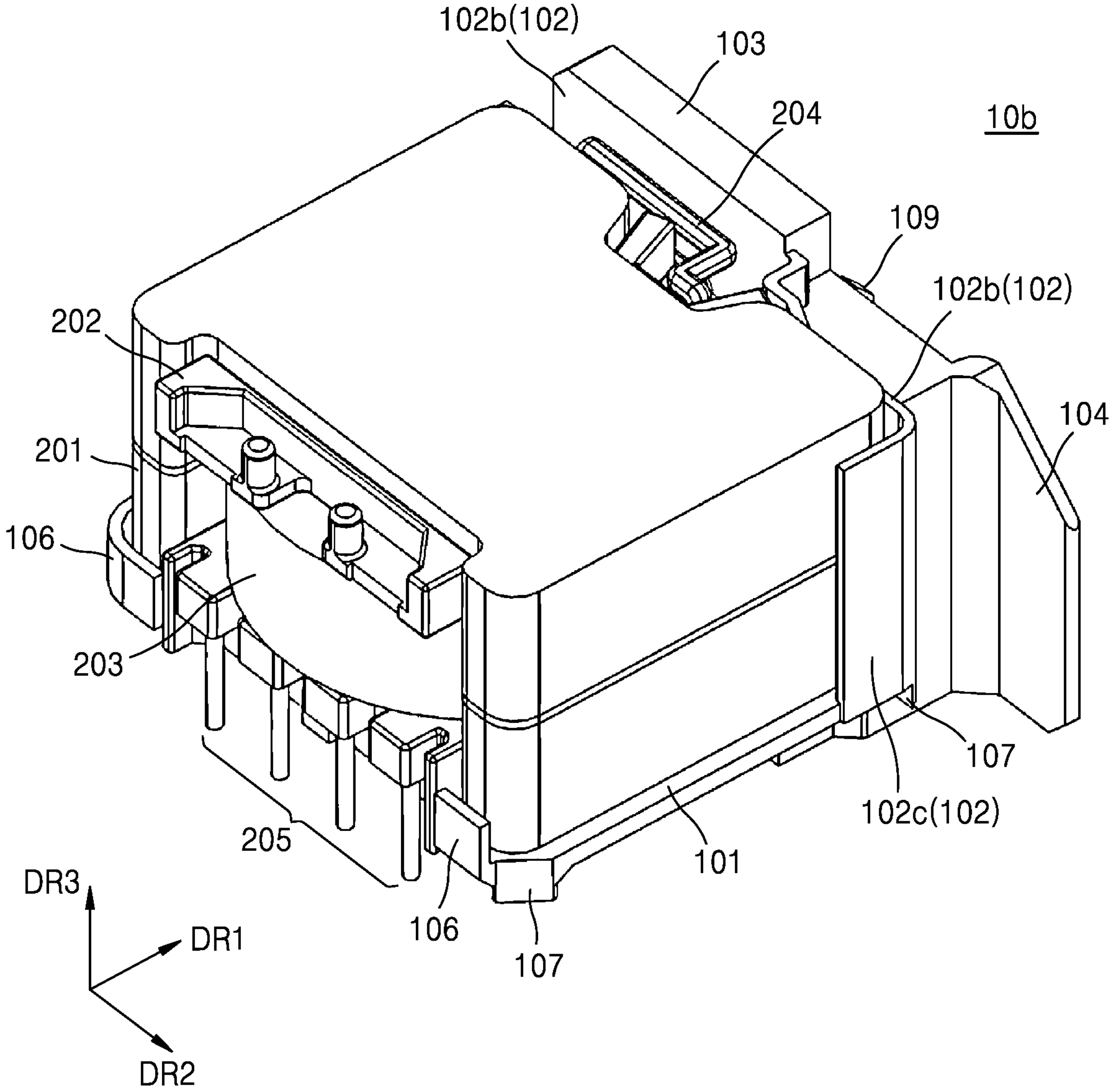
FIG. 19 is another perspective view of the sub-transformer device of FIG. 18.
Figure 20:
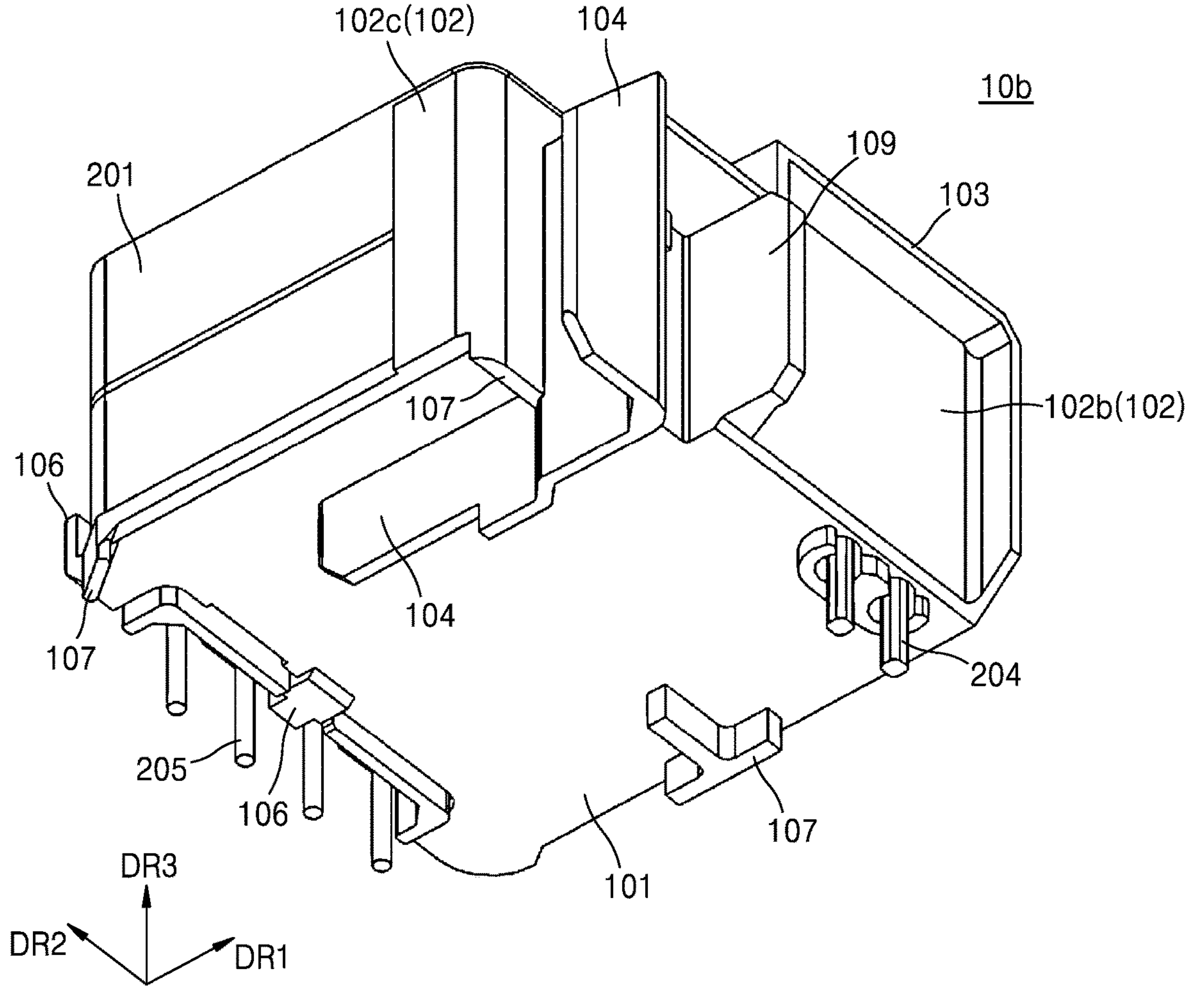
FIG. 20 is another perspective view of the sub-transformer device of FIG. 18.

FIG. 18 is a perspective view of a sub-transformer device 10*b* according to an embodiment. FIG. 19 is another perspective view of the sub-transformer device 10*b* of FIG. 18. FIG. 20 is another perspective view of the sub-transformer device 10*b* of FIG. 18. For simplicity of explanation, descriptions that are substantially the same as those described with reference to FIGS. 6 to 10 and those described with reference to FIGS. 15 to 17 may be omitted Referring to FIGS. 18 to 20, the sub-transformer device 10*b* may be provided. The sub-transformer device 10*b* may include the base 100*b*, the core 201, the bobbin 202, and the coil 203. The base 100*b* may be substantially the same as the base 100*b* described with reference to FIGS. 15 to 17.

The core 201, the bobbin 202, and the coil 203 may be substantially the same as the core 201, the bobbin 202, and the coil 203 described with reference to FIGS. 6 to 10, respectively.

The disclosure may provide the sub-transformer device 10*b* that secures the required insulating distance.

Figure 21:
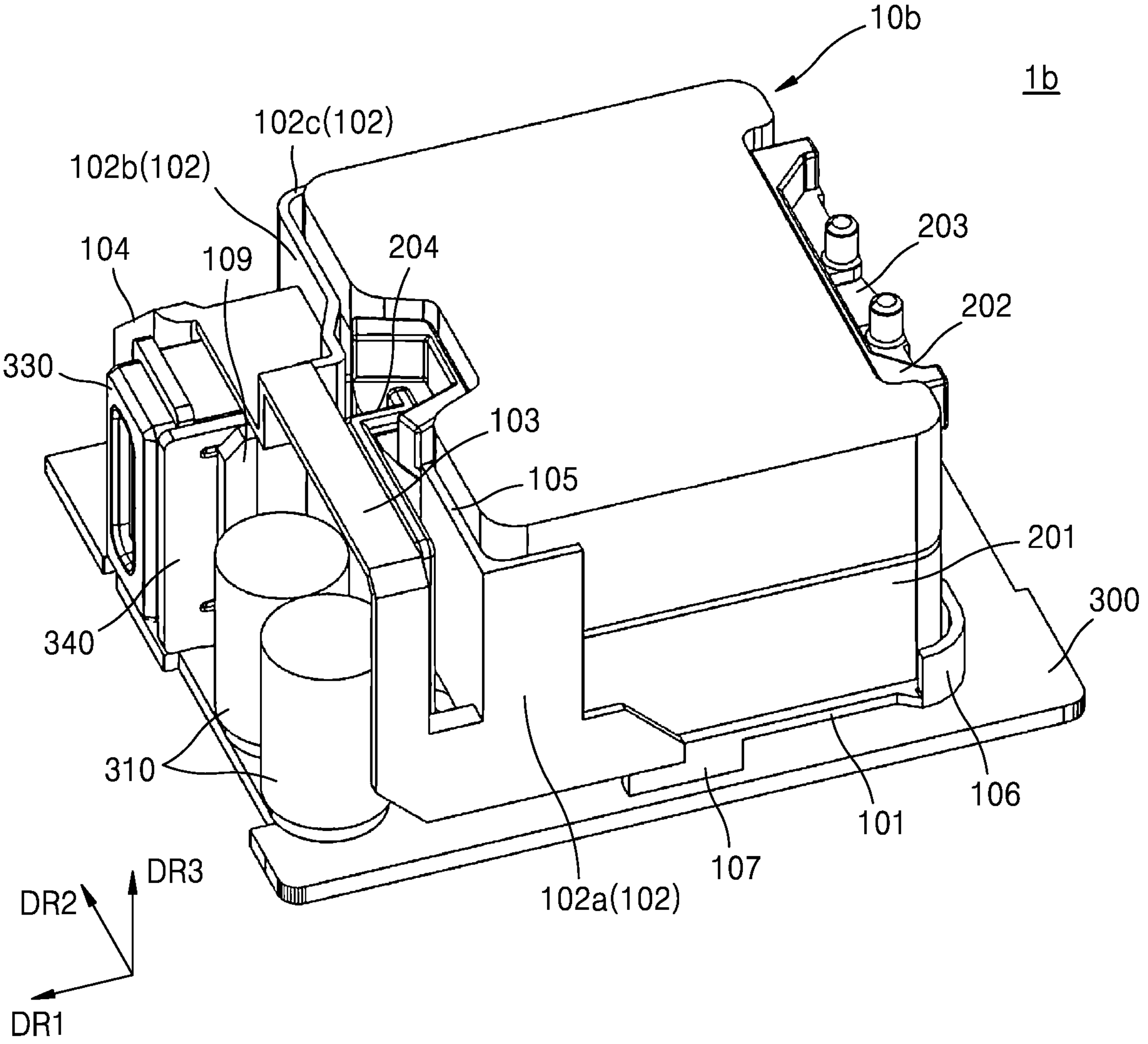
FIG. 21 is a perspective view of a transformer device according to an embodiment.
Figure 22:
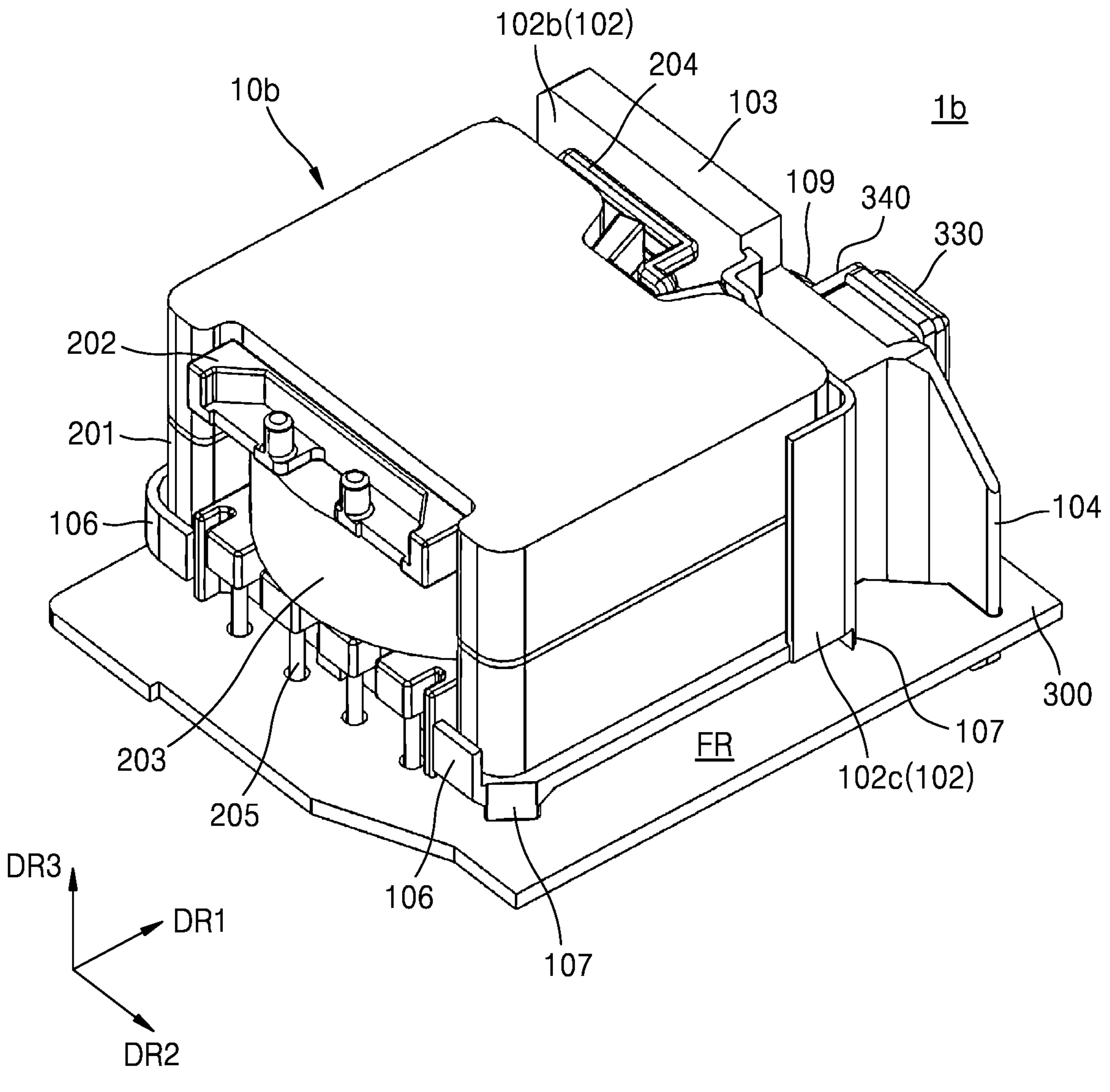
FIG. 22 is another perspective view of the transformer device of FIG. 21.
Figure 23:
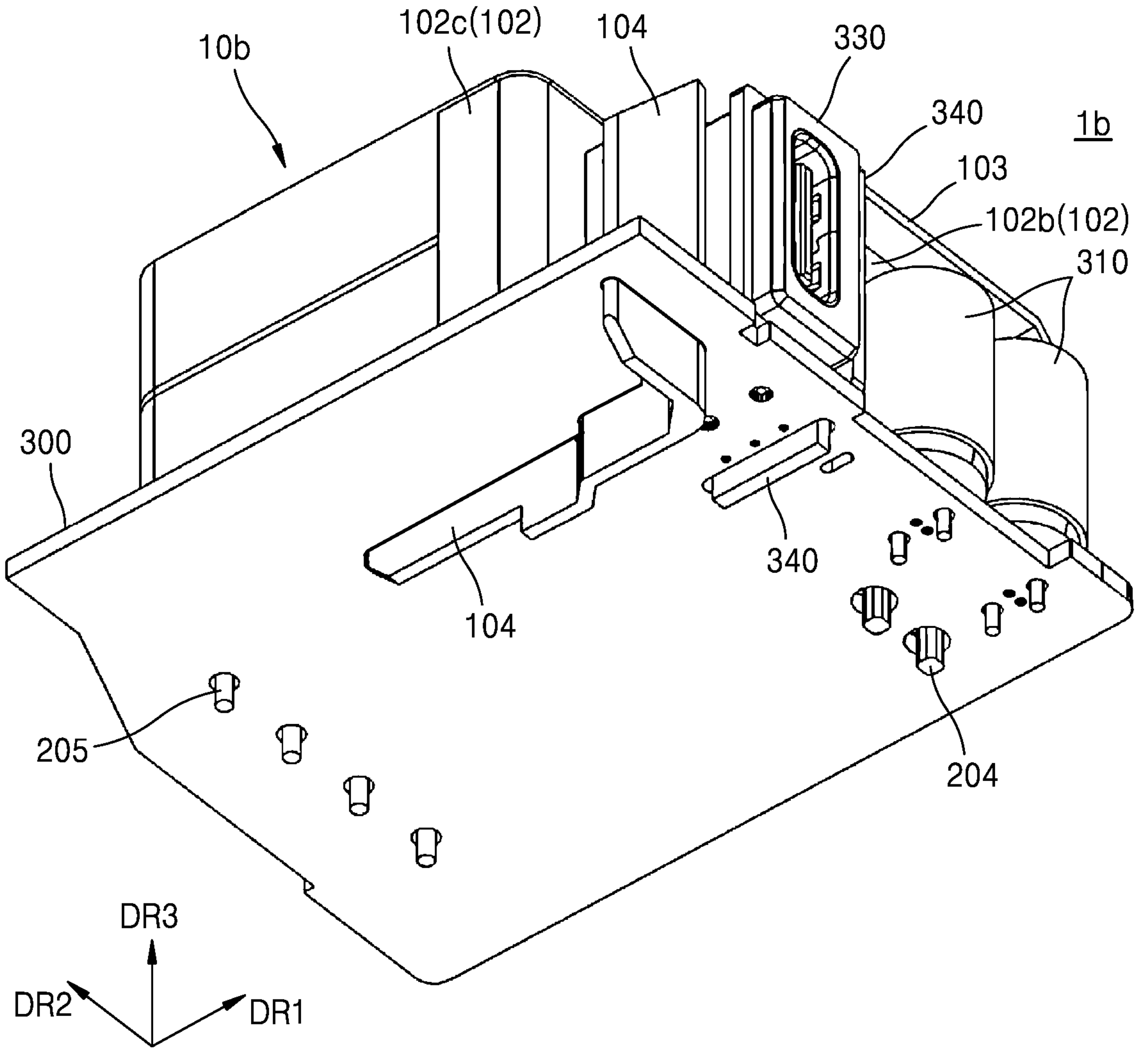
FIG. 23 is another perspective view of the transformer device of FIG. 21.

FIG. 21 is a perspective view of a transformer device 1*b* according to an embodiment. FIG. 22 is another perspective view of the transformer device 1*b* of FIG. 21. FIG. 23 is another perspective view of the transformer device 1*b* of FIG. 21. For simplicity of explanation, descriptions that are substantially the same as those described with reference to FIGS. 11 to 14 and those described with reference to FIGS. 18 to 20 may be omitted.

Referring to FIGS. 21 to 23, the transformer device 1*b* may be provided. Unlike the descriptions with reference to FIGS. 11 to 14, the transformer device 1*b* may include the main substrate 300, the sub-transformer device 10*b*, the primary electronic devices 210, the secondary electronic devices 310, the vertical connector 330, and an auxiliary substrate 340. The sub-transformer device 10*b* may be substantially the same as the sub-transformer device 10*b* with reference to FIGS. 18 to 20. The main substrate 300, the primary electronic devices 210, and the secondary electronic devices 310 may be substantially the same as the main substrate 300, the primary electronic devices 210, and the secondary electronic devices 310, which are described with reference to FIGS. 11 to 14.

The vertical connector 330 may be provided between the vertical support wall 109 and the partition wall 104 and between the insulating cover 103 and the main substrate 300. The vertical connector 330 may be a portion where a terminal of an electronic device is connected to a transformer device. The vertical connector 330 may extend in the third direction DR3. For example, the horizontal connector 320 may include pins of a C-type USB extending in the third direction DR3.

The auxiliary substrate 340 may be provided between the vertical connector 330 and the vertical support wall 109. For example, the auxiliary substrate 340 may be a printed circuit board. For example, the auxiliary substrate 340 may extend in the third direction DR3. The auxiliary substrate 340 may penetrate the main substrate 300. The auxiliary substrate 340 may be electrically connected to the vertical connector 330. The auxiliary substrate 340 may transmit an electrical signal received from the vertical connector 330 to the main substrate 300 or other electronic devices, or transmit an electrical signal received from the main substrate 300 or other electronic devices to the vertical connector 330.

The insulating cover 103 may cover the vertical connector 330 and the secondary electronic devices 310. The insulating cover 103 may be configured to secure an insulating distance, for example, the safety standard distance, required between the core 201 and the secondary electronic devices 310 and the core 201 and the vertical connector 330. For example, the protruding distance of the insulating cover 103 measured from the outer wall 102 may be determined such that the insulating distance between the core 201 and the secondary electronic devices 310 and between the core 201 and the vertical connector 330 is 6.7 mm or more.

The partition wall 104 may be configured to secure the insulating distance, for example, the safety standard distance, required between the core 201 and the secondary electronic devices 310. For example, the size of the partition wall 104 in the third direction DR3 may be determined such that the insulating distance between the primary electronic devices 210 and the secondary electronic devices 310 and between the primary electronic devices 210 and the vertical connector 330 is 6.7 mm or more.

The disclosure may provide the transformer device 1*b* that secures the insulating distance required between the core 201 and the secondary electronic devices 310, between the core 201 and the vertical connector 330, between the primary electronic devices 210 and the secondary electronic devices 310, and between the primary electronic devices 210 and the vertical connector 330.

Figure 24:
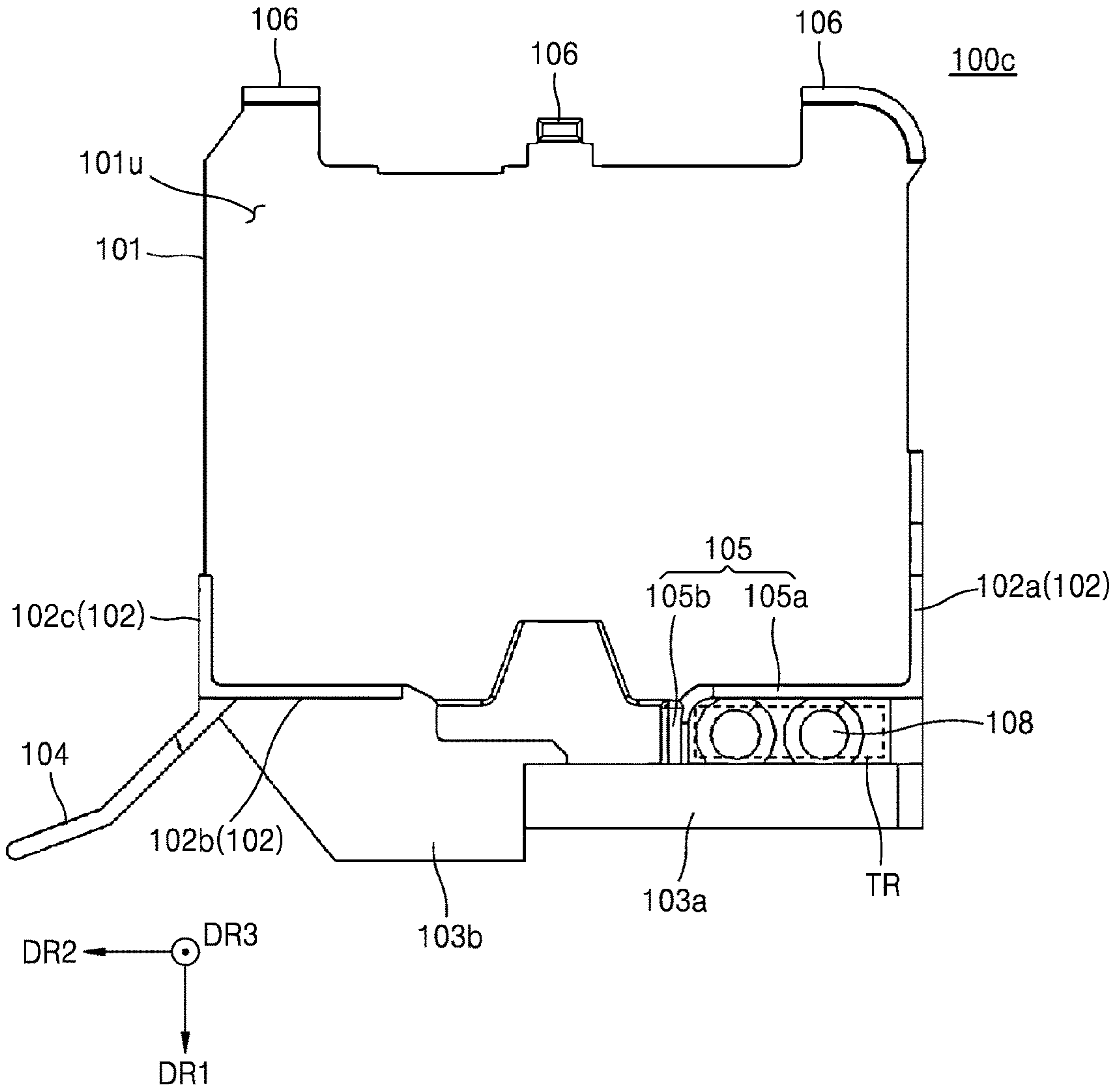
FIG. 24 is a plan view of a base according to an embodiment.

FIG. 24 is a plan view of a base 100*c* according to an embodiment. For simplicity of explanation, descriptions that are substantially the same as those described with reference to FIGS. 1 to 5 may be omitted.

Referring to FIG. 24, the base 100*c* may be provided. Except the shape of a portion of the insulating cover 103 extending in the second direction DR2, the base 100*c* may be substantially the same as the base 100*a* described with reference to FIGS. 1 to 5. A portion of the insulating cover 103 extending in the second direction DR2 may include a lower insulating cover 103*b* and an upper insulating cover 103*a*. The upper insulating cover 103*a* may be arranged at a positon above the upper surface of the support plate 101 higher than the lower insulating cover 103*b*. The lower insulating cover 103*b* may be provided on the horizontal connector described with reference to FIGS. 11 to 14. The upper insulating cover 103*a* may be provided on the secondary electronic devices 310 described with reference to FIGS. 11 to 14. The lower insulating cover 103*b* may further protrude in the first direction DR1 than the upper insulating cover 103*a*.

The insulating distance, for example, the safety standard distance, required between the core and the secondary electronic device and between the core and the horizontal connector may be secured by the upper insulating cover 103*a* and the lower insulating cover 103*b* according to the disclosure.

The upper insulating cover 103*a* and the lower insulating cover 103*b* according to the disclosure may be applied not only to the insulating cover 103 illustrated in FIGS. 1 to 14, but also to the insulating cover 103 illustrated in FIGS. 15 to 23.

Figure 25:
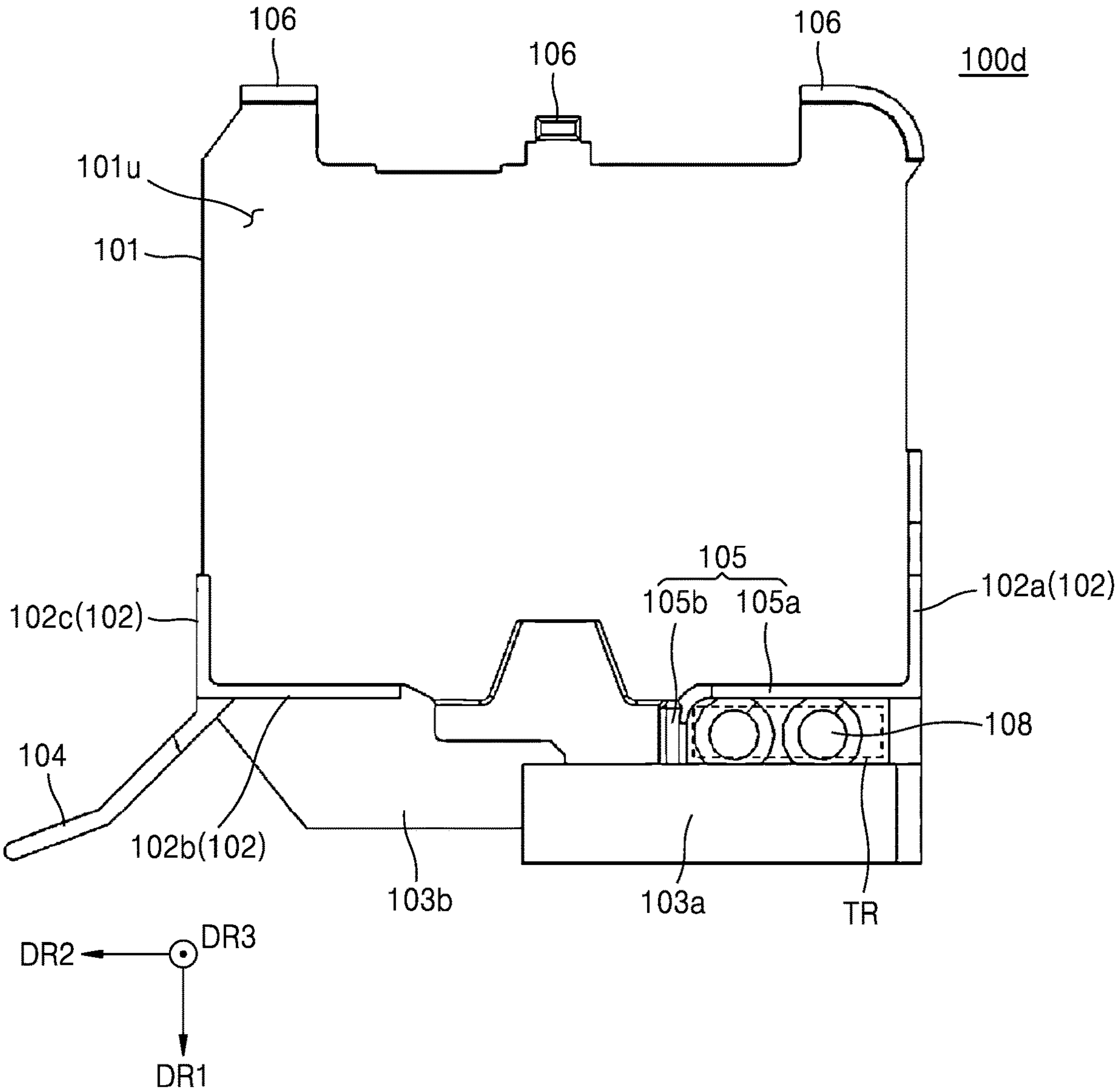
FIG. 25 is a plan view of a base according to an embodiment.

FIG. 25 is a plan view of a base 100*d* according to an embodiment. For simplicity of explanation, descriptions that are substantially the same as those described with reference to FIG. 24 may be omitted.

Referring to FIG. 25, the base 100*d* may be provided. Except the shape of the insulating cover 103, the base 100*d* may be substantially the same as the base 100*c* described with reference to FIG. 24. Unlike the description with reference to FIG. 24, the upper insulating cover 103*a* may further protrude in the first direction DR1 than the lower insulating cover 103*b*.

The insulating distance, for example, the safety standard distance, required between the core and the secondary electronic device and between the core and the horizontal connector may be secured by the upper insulating cover 103*a* and the lower insulating cover 103*b* according to the disclosure.

The upper insulating cover 103*a* and the lower insulating cover 103*b* according to the disclosure may be applied not only to the insulating cover 103 illustrated in FIGS. 1 to 14, but also to the insulating cover 103 illustrated in FIGS. 15 to 23.

The disclosure may provide a base that secures an insulating distance required between the core and the secondary electronic device and/or between the core and the connector, and a transformer device including the base.

The disclosure may provide a base that secures an insulating distance required between the primary electronic device and the secondary electronic device and/or between the primary electronic device and the connector, and a transformer device including the base.

However, the effect of the disclosure is not limited to the above disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A base comprising:

a support plate;

an inner wall provided on the support plate;

an outer wall arranged apart from the inner wall in a first direction parallel to an upper surface of the support plate; and an insulating cover protruding from the outer wall in the first direction, wherein the outer wall and the inner wall extend in a second direction crossing the first direction.

2. The base of claim 1, further comprising a terminal hole in the support plate between the outer wall and the inner wall.

3. The base of claim 1, wherein the insulating cover extends along a boundary of the outer wall.

4. The base of claim 1, further comprising a partition wall protruding from the outer wall, wherein the partition wall extends in a third direction crossing the upper surface of the support plate.

5. The base of claim 4, wherein the partition wall extends from the outer wall to a bottom surface of the support plate.

6. The base of claim 1, further comprising a spacer protruding from the bottom surface of the support plate.

7. The base of claim 6, further comprising a partition wall extending from the outer wall to the bottom surface of the support plate, wherein a distance of the partition wall protruding from the bottom surface of the support plate is greater than a distance of the spacer protruding from the bottom surface of the support plate.

8. The base of claim 1, further comprising a vertical support wall provided below the insulating cover, wherein the vertical support wall extends in a third direction crossing the upper surface of the support plate.

9. A transformer device comprising:

a base comprising a support plate, an inner wall provided on the support plate, an outer wall arranged apart from the inner wall in a first direction parallel to an upper surface of the support plate, and an insulating cover protruding from the outer wall in the first direction;

a core provided on the support plate; and a primary coil and a secondary coil that are magnetically coupled to the core, wherein the outer wall and the inner wall extend in a second direction crossing the first direction.

10. The transformer device of claim 9, wherein the base further comprises support protrusions protruding from the upper surface of the support plate, and the core is provided between the inner wall and the support protrusions.

11. The transformer device of claim 9, further comprising a bobbin around which the primary coil and the secondary coil are wound, wherein the bobbin is coupled to the core.

12. The transformer device of claim 9, further comprising a main substrate; and a secondary electronic devices provided on the main substrate, wherein the base is provided on the main substrate, and the secondary electronic devices is provided between the main substrate and the insulating cover.

13. The transformer device of claim 12, wherein an insulating distance between the core and the secondary electronic devices is about 6.7 mm or more.

14. The transformer device of claim 9, further comprising a main substrate; and a connector provided between the insulating cover and the main substrate, wherein the base is provided on the main substrate.

15. The transformer device of claim 14, further comprising:

a vertical support wall provided between the insulating cover and the main substrate; and an auxiliary substrate provided between the vertical support wall and the connector.

16. The transformer device of claim 15, wherein the auxiliary substrate extends in a third direction crossing the upper surface of the support plate and penetrates the main substrate.

17. The transformer device of claim 9, further comprising:

a main substrate; and a partition wall provided on the outer wall, wherein the base is provided on the main substrate, and the partition wall extends in a third direction crossing the upper surface of the support plate and penetrates the main substrate.

18. The transformer device of claim 17, further comprising:

a primary electronic device provided on the main substrate; and a secondary electronic device provided at a side opposite to the primary electronic device with respect to the partition wall, wherein the primary electronic device is arranged on a circuit electrically connected to the primary coil, and the secondary electronic device is arranged on a circuit electrically connected to the secondary coil.

19. The transformer device of claim 17, further comprising a spacer provided between the support plate and the main substrate.

20. The transformer device of claim 9, further comprising a terminal hole in a support place between the outer wall and the inner wall, wherein a terminal of the secondary coil is inserted in the terminal hole.

* * * * *